(12) United States Patent
Princen et al.

(10) Patent No.: US 10,696,378 B2
(45) Date of Patent: Jun. 30, 2020

(54) CARGO DOOR ASSEMBLY FOR VEHICLE

(71) Applicant: The Boeing Company, Chicago, IL (US)

(72) Inventors: Norman H. Princen, Long Beach, CA (US); Jaime E. Baraja, San Pedro, CA (US); Benjamin A. Harber, Irvine, CA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 15/789,170

(22) Filed: Oct. 20, 2017

(65) Prior Publication Data

US 2019/0118932 A1    Apr. 25, 2019

(51) Int. Cl.
*B64C 9/00* (2006.01)
*B64C 1/14* (2006.01)

(52) U.S. Cl.
CPC .............. *B64C 9/00* (2013.01); *B64C 1/1415* (2013.01); *B64C 2009/005* (2013.01)

(58) Field of Classification Search
CPC ... B64C 1/22; B64C 1/1415; B64C 2039/105; B64C 39/10; B64C 9/00; B64C 25/16; B64D 39/00; B64D 39/02; B64D 39/06; B64D 23/00
See application file for complete search history.

(56) References Cited

U.S. PATENT DOCUMENTS

| | | | | | |
|---|---|---|---|---|---|
| 1,987,050 | A | * | 1/1935 | Burnelli | B64C 39/10 244/36 |
| 4,408,736 | A | * | 10/1983 | Kirschbaum | B64C 25/32 244/100 R |
| 6,382,562 | B1 | * | 5/2002 | Whitlock | B64C 1/22 244/118.3 |
| 2011/0121130 | A1 | * | 5/2011 | Odle | B64C 1/1415 244/36 |
| 2015/0097087 | A1 | * | 4/2015 | Sakurai | B64C 9/00 244/201 |

* cited by examiner

*Primary Examiner* — Philip J Bonzell
*Assistant Examiner* — Nicholas E Brown
(74) *Attorney, Agent, or Firm* — Kunzler Bean & Adamson

(57) ABSTRACT

Described herein is vehicle comprising a body. The vehicle also comprises a cargo door assembly, coupled to the body. The cargo door assembly comprises a first door, movable, relative to the body, between a first closed position and a first open position. The cargo door assembly also comprises a first aerodynamics control surface, coupled to the first door and selectively movable relative to the first door. The preceding subject matter of this paragraph characterizes example 1 of the present disclosure.

20 Claims, 18 Drawing Sheets

CARGO DOOR ASSEMBLY FOR VEHICLE

FIELD

This disclosure relates generally to vehicles, such as aircraft, and more particularly to cargo door assemblies for vehicles, such as aircraft.

BACKGROUND

Some conventional aircraft include cargo doors to facilitate the loading and unloading of passengers and/or cargo into and out from the aircraft. Sometimes, the cargo doors are opened during flight to unload (e.g., drop) passengers and/or cargo from the aircraft. When opened, cargo doors may affect the aerodynamics of the aircraft and thus affect the flight characteristics of the aircraft. Furthermore, for some aircraft, cargo doors can occupy valuable space on the aircraft, which could otherwise be used for flight control surfaces. Accordingly, providing an aircraft with the functionality of cargo doors while promoting control of the flight of the aircraft can be difficult.

SUMMARY

The subject matter of the present application has been developed in response to the present state of the art, and in particular, in response to the problems and disadvantages associated with aircraft having cargo doors that have not yet been fully solved by currently available techniques. Accordingly, the subject matter of the present application has been developed to provide an aircraft with cargo doors that overcomes at least some of the above-discussed shortcomings of prior art techniques.

Described herein is vehicle comprising a body. The vehicle also comprises a cargo door assembly, coupled to the body. The cargo door assembly comprises a first door, movable, relative to the body, between a first closed position and a first open position. The cargo door assembly also comprises a first aerodynamics control surface, coupled to the first door and selectively movable relative to the first door. The preceding subject matter of this paragraph characterizes example 1 of the present disclosure.

The body defines an interior space of the vehicle. The body comprises a body leading end and a body trailing end. The body trailing end is opposite the body leading end. The cargo door assembly is coupled to the body trailing end of the body. The first door restricts access to the interior space of the vehicle in the first closed position. The first door allows access to the interior space of the vehicle in the first open position. Movement of the first aerodynamics control surface relative to the first door adjusts at least one of a pitch or a roll of the vehicle when in motion. The preceding subject matter of this paragraph characterizes example 2 of the present disclosure, wherein example 2 also includes the subject matter according to example 1, above.

The vehicle is a blended wing body aircraft. The preceding subject matter of this paragraph characterizes example 3 of the present disclosure, wherein example 3 also includes the subject matter according to any one of examples 1 or 2, above.

The first door comprises a door trailing end. The first aerodynamics control surface is coupled to the door trailing end of the first door. The preceding subject matter of this paragraph characterizes example 4 of the present disclosure, wherein example 4 also includes the subject matter according to any one of examples 1-3, above.

The first aerodynamics control surface is selectively movable relative to the first door when the first door is in the first closed position, the first open position, and while the first door moves between the first closed position and the first open position. The preceding subject matter of this paragraph characterizes example 5 of the present disclosure, wherein example 5 also includes the subject matter according to any one of examples 1-4, above.

The cargo door assembly further comprises an aerodynamics control surface assembly comprising the first aerodynamics control surface and a door interface. The door interface couples the first aerodynamics control surface to the first door. The door interface comprises at least one aerodynamics control surface actuator, selectively actuatable to move the first aerodynamics control surface relative to the first door. The preceding subject matter of this paragraph characterizes example 6 of the present disclosure, wherein example 6 also includes the subject matter according to any one of examples 1-5, above.

The first door comprises an interior surface and an exterior surface, opposite the interior surface. The door interface is coupled directly to the interior surface of the first door. The preceding subject matter of this paragraph characterizes example 7 of the present disclosure, wherein example 7 also includes the subject matter according to example 6, above.

The first door pivots about a first door axis that is parallel to a pitch axis of the vehicle. The preceding subject matter of this paragraph characterizes example 8 of the present disclosure, wherein example 8 also includes the subject matter according to any one of examples 1-7, above.

The first aerodynamics control surface pivots about a first aerodynamics control surface axis that is parallel to the pitch axis of the vehicle. The preceding subject matter of this paragraph characterizes example 9 of the present disclosure, wherein example 9 also includes the subject matter according to example 8, above.

The cargo door assembly further comprises a second door, movable, relative to the body and the first door, between a second closed position and a second open position. The first door pivots about a first door axis that is parallel to a pitch axis of the vehicle. The second door pivots about a second door axis that is parallel to the pitch axis of the vehicle and offset from the first door axis. The preceding subject matter of this paragraph characterizes example 10 of the present disclosure, wherein example 10 also includes the subject matter according to any one of examples 1-9, above.

The cargo door assembly further comprises an aerodynamics control surface assembly comprising the first aerodynamics control surface and a door interface, coupling the first aerodynamics control surface to the first door. The second door is sealed to the door interface when the first door is in the first closed position and the second door is in the second closed position. The preceding subject matter of this paragraph characterizes example 11 of the present disclosure, wherein example 11 also includes the subject matter according to example 10, above.

The first door is an upper door. The second door is a lower door. The preceding subject matter of this paragraph characterizes example 12 of the present disclosure, wherein example 12 also includes the subject matter according to any one of examples 10 or 11, above.

The vehicle is an aircraft. The cargo door assembly further comprises a second aerodynamics control surface, coupled to the second door and selectively movable relative to the second door to adjust at least one of a pitch or a roll of the aircraft when in flight. The preceding subject matter of this paragraph characterizes example 13 of the present disclosure, wherein example 13 also includes the subject matter according to example 12, above.

The first aerodynamics control surface and the second aerodynamics control surface are co-movably engaged when the first door is in the first closed position and the second door is in the second closed position. The preceding subject matter of this paragraph characterizes example 14 of the present disclosure, wherein example 14 also includes the subject matter according to example 13, above.

The first door is a lower door. The second door is an upper door. The preceding subject matter of this paragraph characterizes example 15 of the present disclosure, wherein example 15 also includes the subject matter according to any one of examples 10 or 11, above.

The cargo door assembly further comprises web shields each secured to and extending between the first door and the second door. The web shields are spaced apart from each other across a width of the first door and the second door. The web shields each comprises a flexible sheet and a plurality of perforations formed in the flexible sheet. The preceding subject matter of this paragraph characterizes example 16 of the present disclosure, wherein example 16 also includes the subject matter according to any one of examples 10-15, above.

Further described herein is a system of a vehicle. The system comprises a cargo door assembly. The cargo door assembly comprises a first door, movable between a first closed position and a first open position. The cargo door assembly also comprises a first aerodynamics control surface, movably coupled to the first door. The cargo door assembly further comprises an actuator, coupled to the first aerodynamics control surface. The system also comprises a controller, operatively coupled with the actuator and configured to cause the actuator to move the first aerodynamics control surface relative to the first door in response to aerodynamics control input. The preceding subject matter of this paragraph characterizes example 17 of the present disclosure.

The controller is further configured to cause the actuator to move the first aerodynamics control surface relative to the first door in further response to a position status of the first door. The controller comprises a closed door module, configured to cause the actuator to move the first aerodynamics control surface relative to the first door according to a first mode of operation when the position status of the first door is closed. The controller also comprises an open door module, configured to cause the actuator to move the first aerodynamics control surface relative to the first door according to a second mode of operation when the position status of the first door is open. The controller additionally comprises a transitioning door module, configured to cause the actuator to move the first aerodynamics control surface relative to the first door according to a third mode of operation when the position status of the first door is transitioning between the first closed position and the first open position. The first mode of operation, the second mode of operation, and the third mode of operation are different from each other. The preceding subject matter of this paragraph characterizes example 18 of the present disclosure, wherein example 18 also includes the subject matter according to example 17, above.

Additionally described herein is method of controlling movement of a vehicle. The method comprises receiving aerodynamics control input. The method also comprises moving a first aerodynamics control surface in response to the aerodynamics control input. The first aerodynamics control surface is movably coupled to a first door of a cargo door assembly of the vehicle. The preceding subject matter of this paragraph characterizes example 19 of the present disclosure.

Moving the first aerodynamics control surface further comprises moving the first aerodynamics control surface according to a first mode of operation when the first door is in a first closed position. Moving the first aerodynamics control surface further additionally comprises moving the first aerodynamics control surface according to a second mode of operation when the first door is in a first open position. Moving the first aerodynamics control surface further also comprises moving the first aerodynamics control surface according to a third mode of operation when the first door is moving between the first open position and the first closed position. The first mode of operation, the second mode of operation, and the third mode of operation are different from each other. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Some embodiments of the present disclosure provide an aircraft with rear cargo doors having a clam-shell design where at least one of the doors includes an aerodynamics control surface. In one implementation, the aircraft is a blended wing body aircraft with aerodynamics control surfaces at a rear of the aircraft, which help control the pitch and/or roll of the aircraft. To provide the features and advantages associated with rear cargo doors, without substantially impacting the pitch and/or roll control capability of the blended wing body aircraft, at least one aerodynamics control surface is coupled to one or both of the rear cargo doors. In this manner, the pitch and/or roll control capability of the blended wing body aircraft is substantially preserved whether the rear cargo doors are closed or open.

Figure 1:
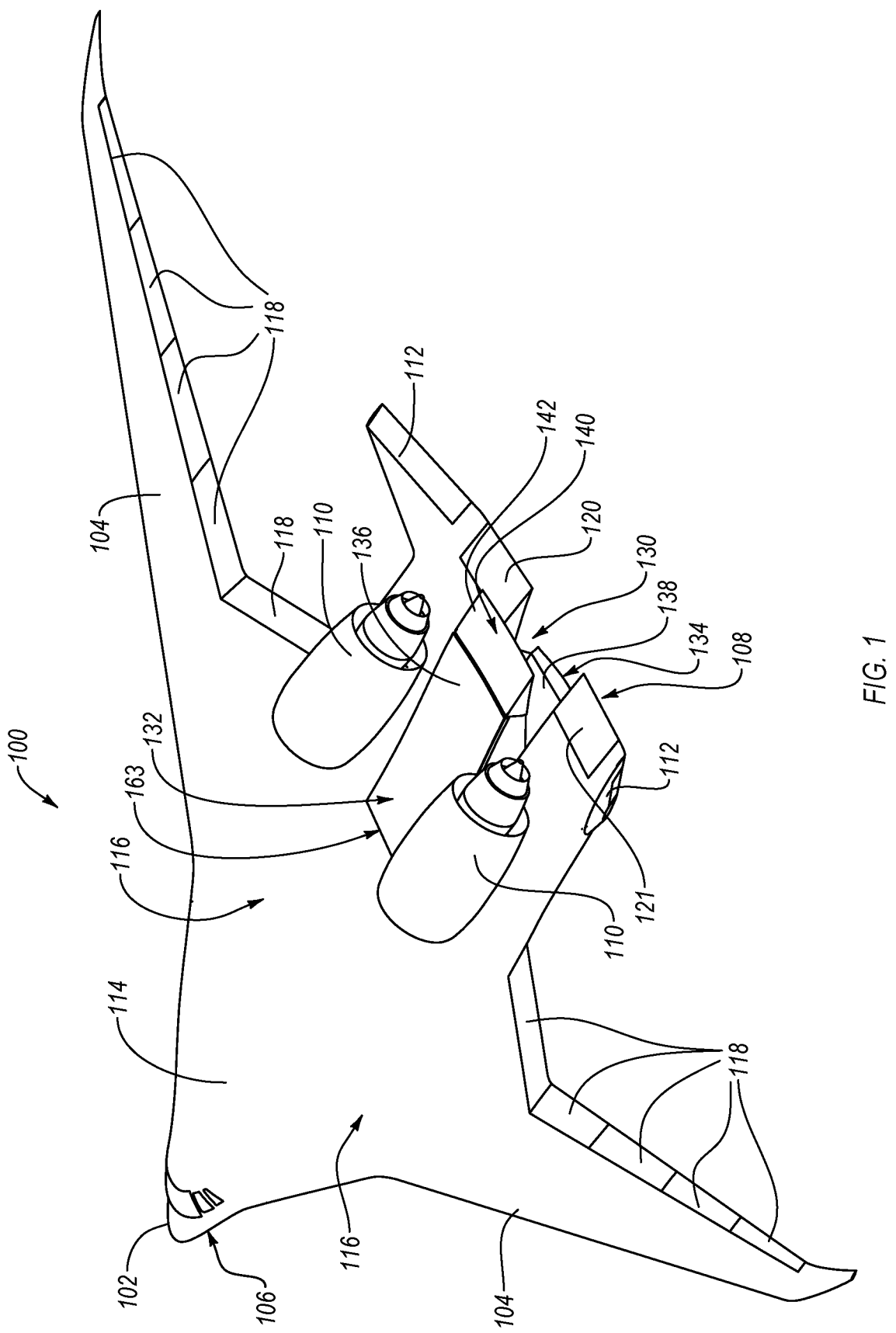
FIG. 1 is a perspective view of an aircraft, from above and to the rear of the aircraft, according to one or more examples of the present disclosure.
Figure 2:
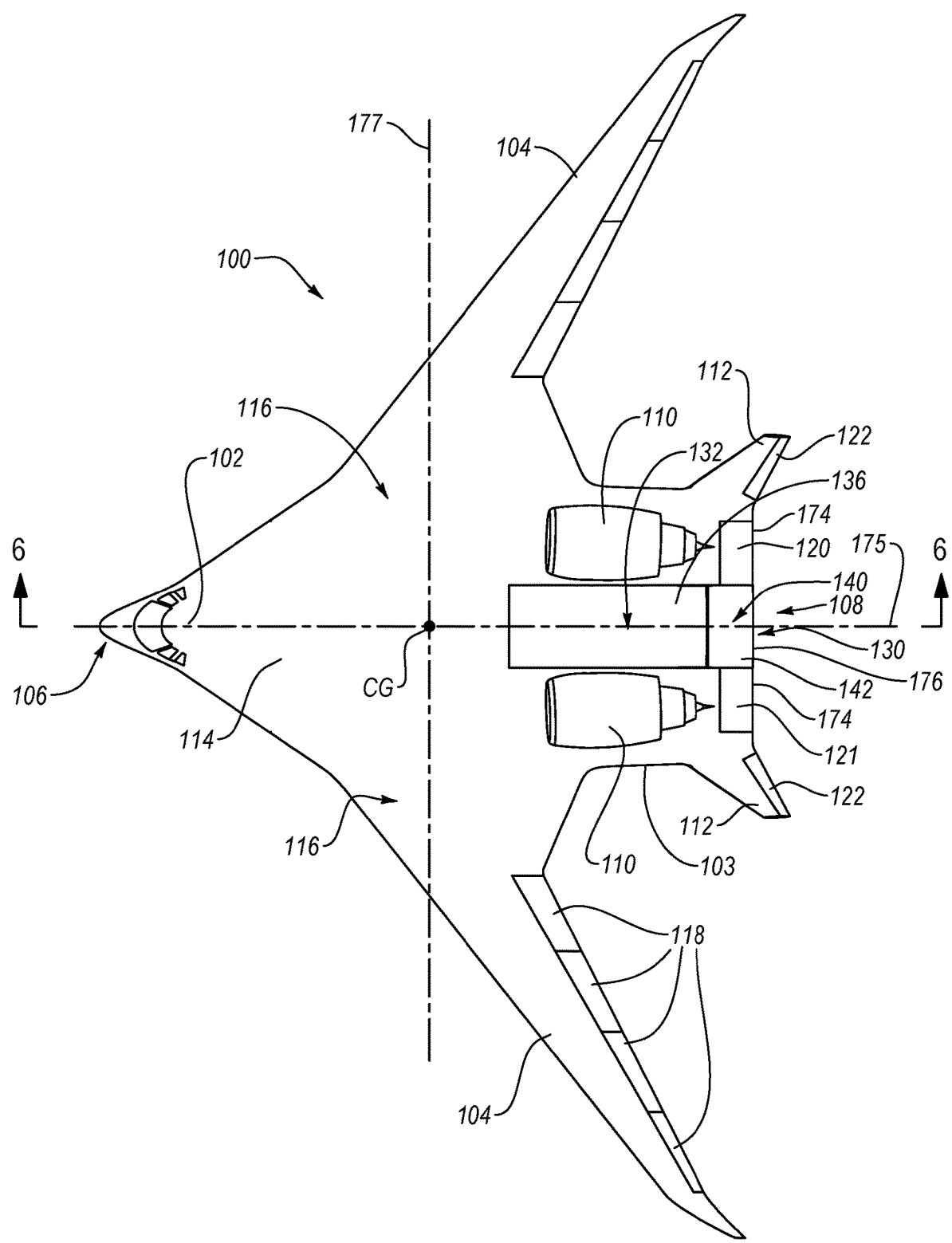
FIG. 2 is a top plan view of the aircraft of FIG. 1, according to one or more examples of the present disclosure.
Figure 3:
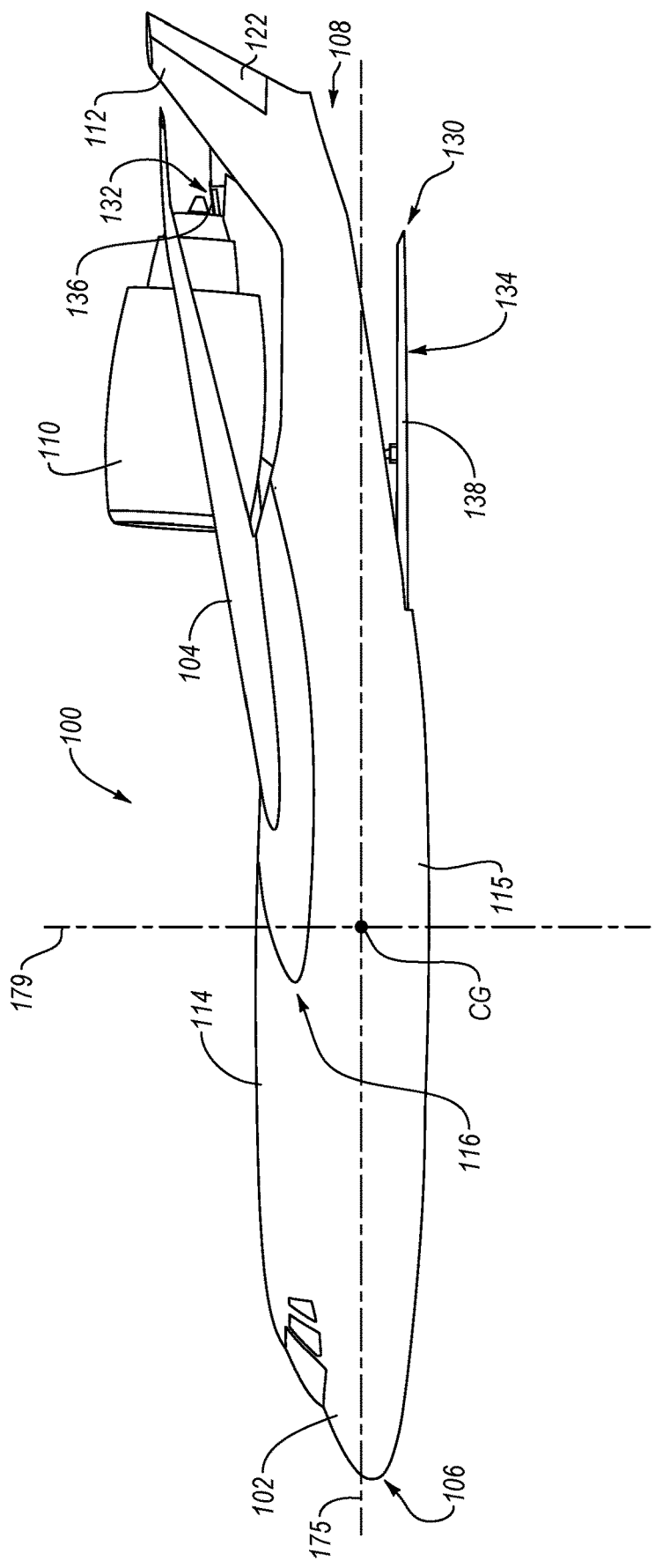
FIG. 3 is a side elevation view of the aircraft of FIG. 1, according to one or more examples of the present disclosure.

Referring to FIGS. 1-3, one embodiment of an aircraft 100 is shown. The aircraft 100 includes a body 102 (e.g., fuselage), a pair of wings 104 coupled to and extending from the body 102, and a pair of vertical stabilizers 112 coupled to and extending from the body 102. The aircraft 100 of the illustrated embodiment can be categorized as a so-called blended wing body aircraft or an aircraft with a blended wing body design. A blended wing body aircraft, like the aircraft 100, is a fixed-wing aircraft with no clear division between the body of the aircraft and the wings of the aircraft. In other words, the wings of a blended wing body aircraft smoothly blend into the body across a wing-body transition region. For example, the wings 104 of the aircraft 100 smoothly blend into the body 102 at respective wing-body transition regions 116. Another feature of a blended wing body aircraft is the body has a wider, flatter, and more airfoil shaped body compared to the narrower, rounder, and non-airfoil shaped conventional aircraft. The wide airfoil shaped body of blended wing body aircraft helps to produce higher lift-to-drag ratios that conventional aircraft. Notwithstanding the particular shape of the body 102, the body 102 defines an interior space 154 (see, e.g., FIGS. 4 and 5). The interior space 154 can be used to store any of various objects, such as passengers, cargo, and the like.

The body 102 extends along a roll axis 175 of the aircraft 100 from a body leading end 106 (e.g., front of the aircraft 100) to a body trailing end 108 (e.g., rear of the aircraft 100). The wings 104 extend from the body 102 at locations between the body leading end 106 and the body trailing end 108. In some implementations, trailing edges of the wings 104, at the connection with the body 102, are substantially coexistent with the trailing edge of the body 102, similar to a flying-wing type aircraft. However, in other implementations, such as shown in FIG. 2, some tail-like portion 103 of the body 102 extends between the trailing edges of the wings 104, at the connection with the body 102, and the body trailing end 108. However, the tail-like portion 103 of the body 102 is significantly shorter than that of conventional passenger and parcel-delivery aircraft.

The aircraft 100 has a top side 114 and a bottom side 115, opposite the top side 114. Accordingly, a surface at the top side 114 is considered a top surface and a surface at the bottom side 115 is considered a bottom surface. The aircraft 100 includes a pair of engines 110, which can be jet engines, operable to propel the aircraft 100. The engines 110 are attached to the body 102 on the top side 114 of the aircraft 100. In some implementations, each of the engines 110 is attached to a respective one of the wing-body transition regions 116 on the top side 114 of the aircraft 100. The engines 110 are spaced apart in a direction parallel to a pitch axis 177 of the aircraft 100. Generally, the engines 110 are spaced apart a distance greater than a width of an upper door 136 of a cargo door assembly 130, as will be explained in more detail below. In other embodiments, the engines 110 can be attached to other parts of the aircraft 100, such as the wings 104, on the bottom side 115 of the aircraft 100, or the vertical stabilizers 112.

The aircraft 100 includes several aerodynamics control surfaces. For aircraft and spacecraft, the aerodynamics control surfaces are considered flight control surfaces. In contrast, for land or water vehicles, aerodynamics control surfaces are considered motion control surfaces. In the illustrated embodiment, the aerodynamics control surfaces include multiple ailerons 118 coupled to the wings 104, at the trailing edges of the wings 104, and positioned spanwise along the wings 104. Each aileron 118 includes a flap that is adjustable to adjust a roll (e.g., rotation about the roll axis 175) of the aircraft 100. Additionally, for example, the aircraft 100 includes a third aerodynamics control surface 120 and a fourth aerodynamics control surface 121 coupled to the body 102 at the body trailing end 108.

The third aerodynamics control surface 120 and the fourth aerodynamics control surface 121 can each be an elevon or multiple elevons. For example, each of the third aerodynamics control surface 120 and the fourth aerodynamics control surface 121 includes a flap that is adjustable to adjust a roll and/or a pitch (e.g., rotation about the pitch axis 177) of the aircraft 100. In some implementations, depending on the flight characteristics of the aircraft 100 (or motion characteristics of the vehicle), adjustment of the third aerodynamics control surface 120 and/or the fourth aerodynamics control surface 121 adjusts only a roll of the aircraft 100. In other implementations, depending on the flight characteristics of the aircraft 100, adjustment of the third aerodynamics control surface 120 and/or the fourth aerodynamics control surface 121 adjusts only a pitch of the aircraft 100. According to yet certain implementations, depending on the flight characteristics of the aircraft 100, adjustment of the third aerodynamics control surface 120 and/or the fourth aerodynamics control surface 121 adjusts both a roll and a pitch of the aircraft 100. The third aerodynamics control surface 120 is spaced apart from the fourth aerodynamics control surface 121 in a direction parallel to the pitch axis 177.

Figure 4:
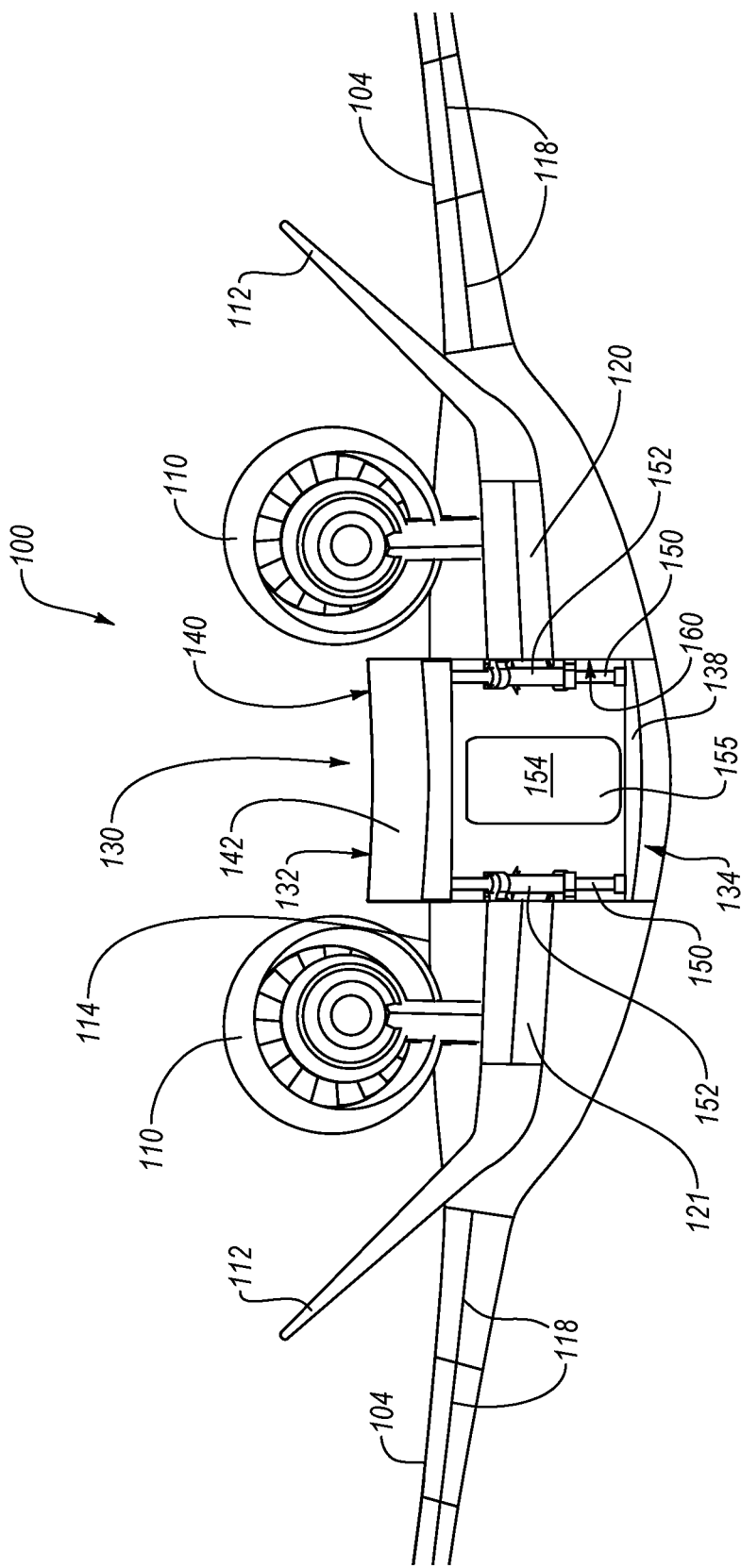
FIG. 4 is a rear view of the aircraft of FIG. 1, according to one or more examples of the present disclosure.
Figure 5:
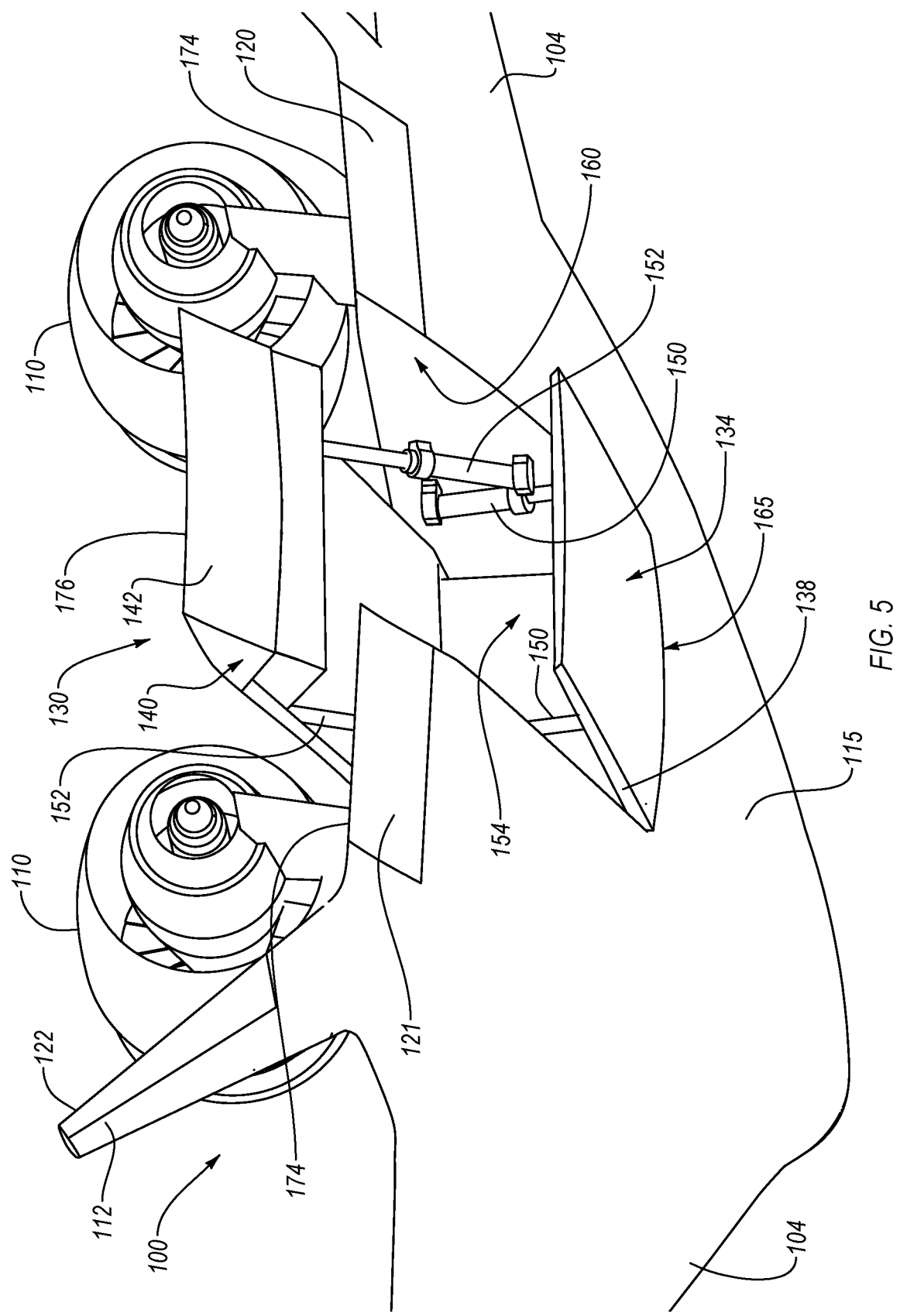
FIG. 5 is a perspective view of the aircraft of FIG. 1, from below and to the rear of the aircraft, according to one or more examples of the present disclosure.
Figure 11:
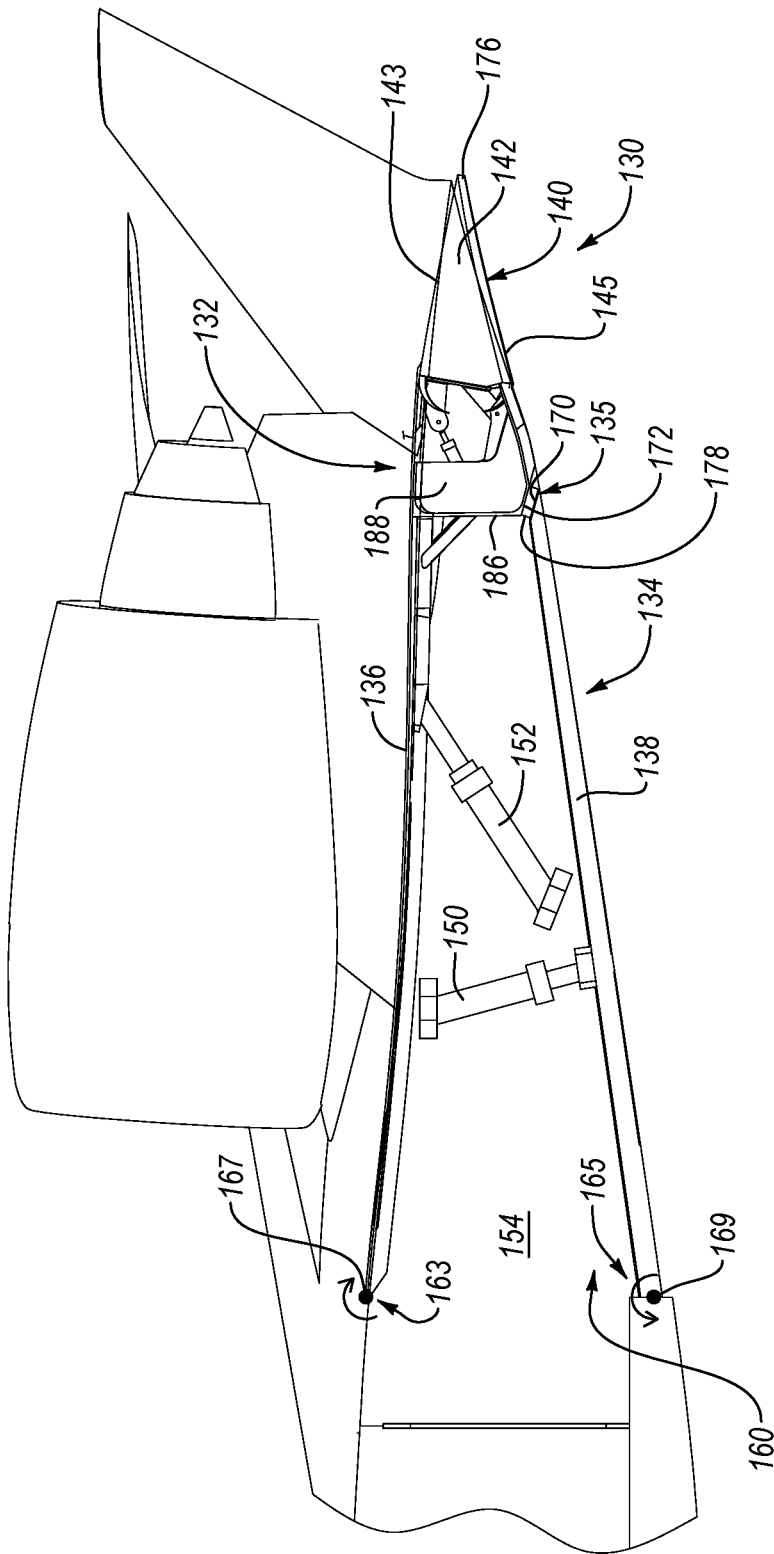
FIG. 11 is a cross-sectional side elevation view of a cargo door assembly of the aircraft of FIG. 1, taken along the line 6-6 of FIG. 2 and shown with doors of the cargo door assembly in a closed position, according to one or more examples of the present disclosure.

Referring again to FIGS. 1-3, the cargo door assembly 130 is coupled to the body 102 of the aircraft 100. More specifically, the cargo door assembly 130 is coupled to the body trailing end 108 of the body 102. For example, as shown in FIGS. 4 and 5, the cargo door assembly 130 is positioned within a slot 160 formed into the body 102 at the body trailing end 108. The slot 160 extends forwardly along the roll axis 175 from a trailing edge of the body 102 to a location intermediate the trailing edge of the body 102 and a leading edge of the body 102. Additionally, the slot 160 extends along a yaw axis 179 from the top side 114 of the body 102 to the bottom side 115 of the body 102 such that the slot 160 is open at the top side 114 and the bottom side 115. When closed, such as shown in FIG. 11, the cargo door assembly 130 effectively fills the slot 160 and by extension effectively defines the top side 114 and the bottom side 115 of the body 102 at the slot 160.

The cargo door assembly 130 includes an upper door portion 132 and a lower door portion 134. The upper door portion 132 includes an upper door 136 or first door and the lower door portion 134 includes a lower door 138 of second door. When closed, the upper door 136 effectively defines the top side 114 of the body 102 and the lower door 138 effectively defines the bottom side 115 of the body 102. Accordingly, the upper door 136 is considered an upper door and the lower door 138 is considered a lower door.

Figure 6:
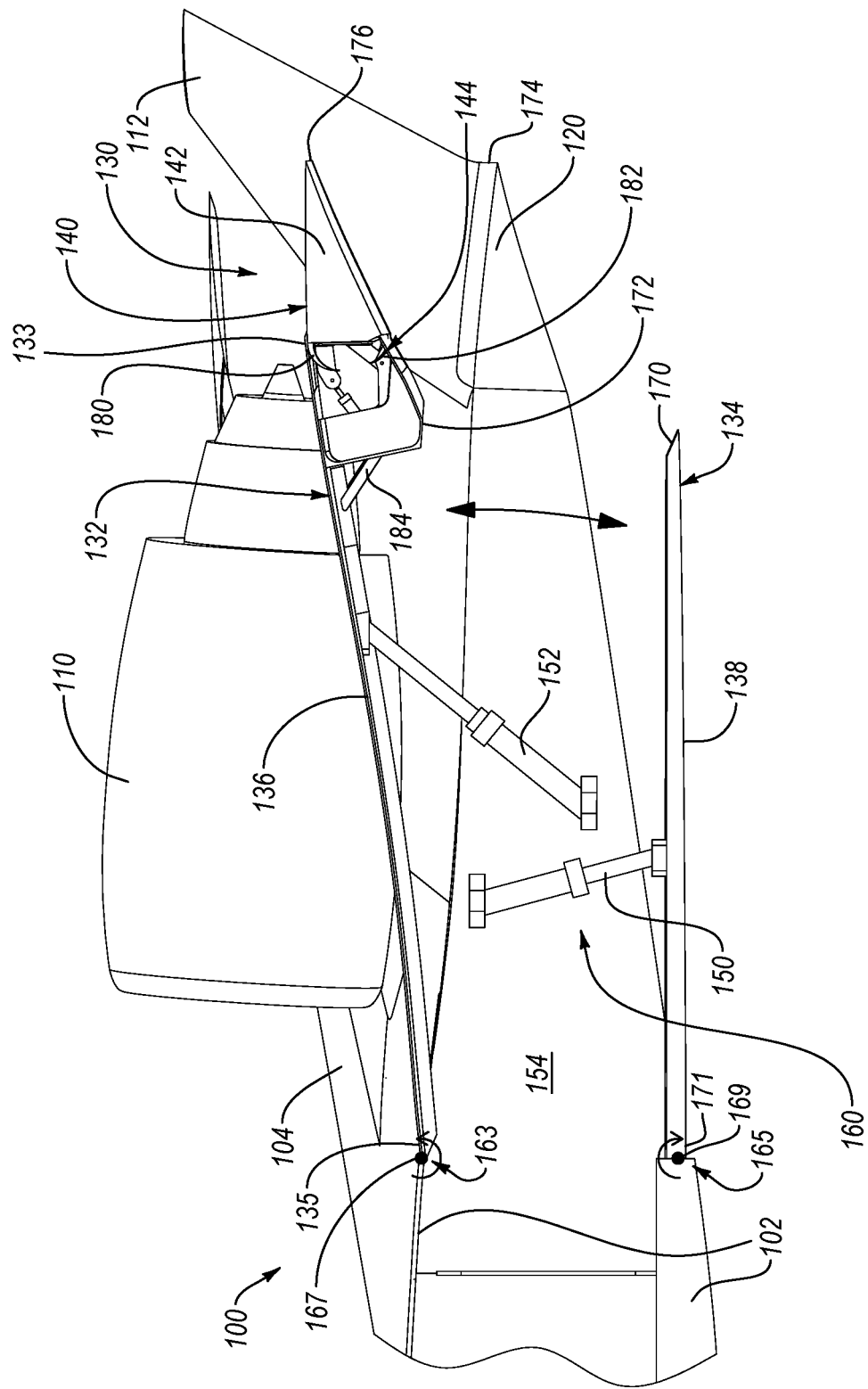
FIG. 6 is a cross-sectional side elevation view of a cargo door assembly of the aircraft of FIG. 1, taken along the line 6-6 of FIG. 2 and shown with doors of the cargo door assembly in an open position, according to one or more examples of the present disclosure.

The cargo door assembly 130 has a clam-shell design. More specifically, the upper door 136 and the lower door 138 move relative to the body 102, and relative to each other, away from and toward each other to open and close the cargo door assembly 130. Referring to FIG. 6, the upper door 136 and the lower door 138 are hingedly coupled to the body 102, via a first hinge mechanism 163 and a second hinge mechanism 165, respectively, at respective leading ends 135, 171 of the upper door 136 and the lower door 138. The first hinge mechanism 163 facilitates pivoting of the upper door 136 about a first door axis 167. The second hinge mechanism 165 facilitates pivoting of the lower door 138 about a second door axis 169. The first hinge mechanism 163 and the second hinge mechanism 165 can be any of various hinge mechanisms known in the art, such as butt hinges, flush hinge, and the like. The first door axis 167 and the second door axis 169 are parallel to each other and the pitch axis 177 of the aircraft 100. Moreover, the first door axis 167 and the second door axis 169 are offset from each other in a direction at least substantially parallel with the yaw axis 179.

Pivoting of the upper door 136 and the lower door 138 about the first door axis 167 and the second door axis 169, respectively, is effectuated by door actuators 152 and door actuators 150. The door actuators 152 are fixed at one end to the body 102 and fixed at an opposite end to the upper door 136. Similarly, the door actuators 150 are fixed at one end to the body 102 and fixed at an opposite end to the lower door 138. In one implementation, each of the door actuators 150, 152 is a linear actuator, such as a hydraulic-powered or pneumatic-powered piston cylinder. Each of the door actuators 150, 152 is configured to move the opposite ends relative to each other when actuated. Accordingly, the door actuators 150, 152 are actuatable to move the opposite ends away from each other, to cause the upper door 136 and the lower door 138 to pivot away from each other to open the cargo door assembly 130, and actuatable to move the opposite ends toward each other, to cause the upper door 136 and the lower door 138 to pivot towards each other to close the cargo door assembly 130. The cargo door assembly 130 is open when the upper door 136 is in a first open position and the lower door 138 is in a second open position (see, e.g., FIG. 6). In contrast, the cargo door assembly 130 is closed when the upper door 136 is in a first closed position and the lower door 138 is in a second closed position (see, e.g., FIG. 11).

Figure 5A:
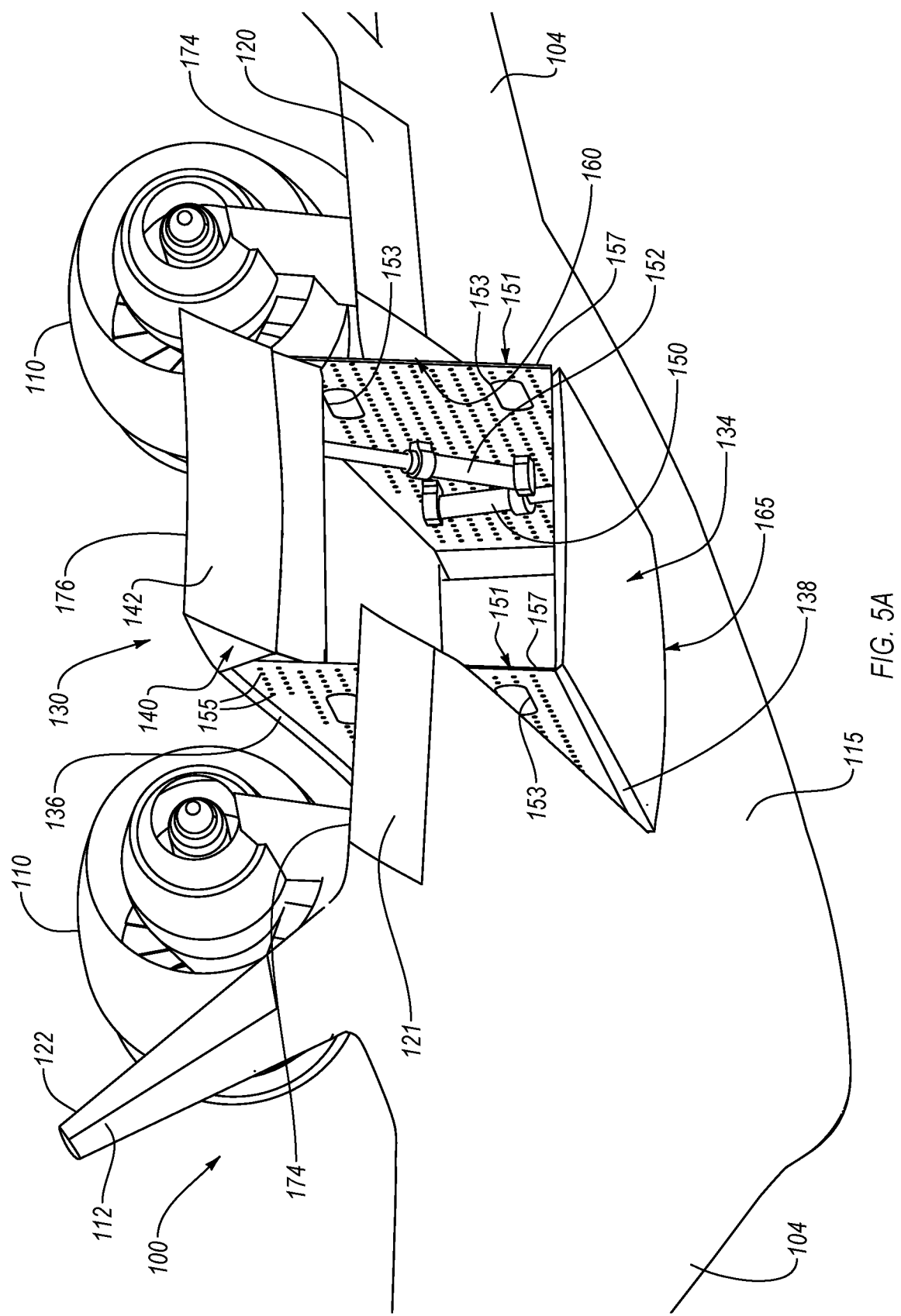
FIG. 5A is a perspective view of the aircraft of FIG. 1, from below and to the rear of the aircraft and shown with a web shield, according to one or more examples of the present disclosure.
Figure 6A:
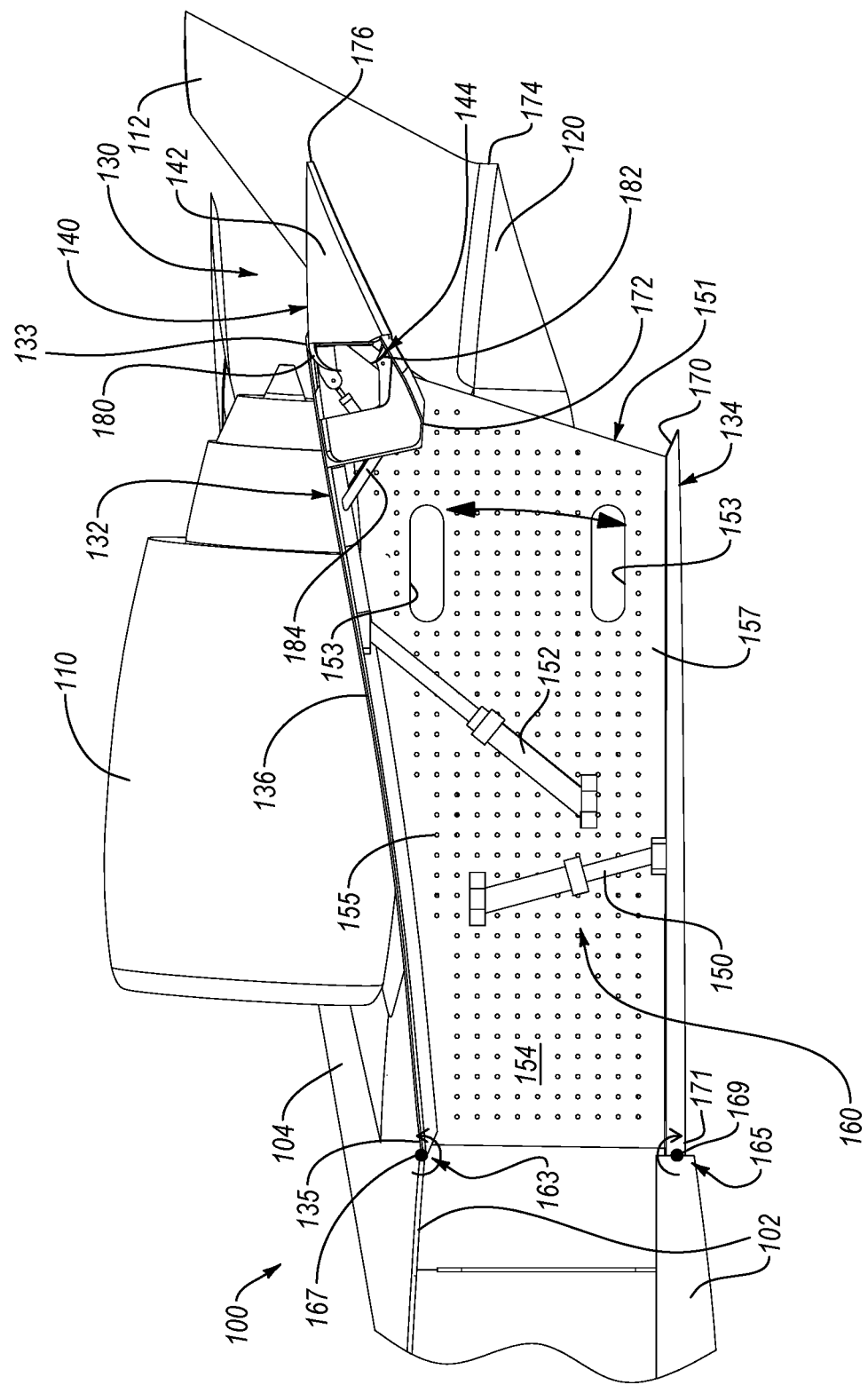
FIG. 6A is a cross-sectional side elevation view of a cargo door assembly of the aircraft of FIG. 1, taken along the line 6-6 of FIG. 2 and shown with doors of the cargo door assembly in an open position and with a web shield, according to one or more examples of the present disclosure.

Referring to FIGS. 5A and 6A, in some embodiments, the cargo door assembly 130 further includes a pair of web shields 151 extending between the upper door 136 and the lower door 138. More specifically, each of the web shields 151 is secured to respective lateral sides of the upper door 136 and the lower door 138. Accordingly, the web shields 151 are laterally spaced apart from each other across a width of the upper door 136 and the lower door 138. The web shields 151 are flexible and collapsible such that when the upper door 136 and the lower door 138 are in the closed position, the web shields 151 are collapsed. However, as the upper door 136 and the lower door 138 transition into the open position, the web shields 151 are incrementally unfurled until in the open position, as shown in FIGS. 5A and 6A, the web shields 151 are fully unfurled. When the upper door 136 and the lower door 138 are in the open position and the web shields are fully unfurled, the web shields 151 help to define the lateral extent of the interior space 154 between the upper door 136 and the lower door 138.

Each web shield 151 is perforated. For example, in one embodiment, each web shield 151 includes a flexible sheet 157 with a plurality of perforations 155 formed in the flexible sheet 157. The flexible sheet 157 is made of a cloth, such as glass fiber cloth, in some implementations. The cloth can be coated with a protective coating, such as neoprene. The perforations 155 are small, such as about 1 inch in diameter in certain implementations, and spaced apart from each other, such as 5 inches apart, to form a grid-like pattern on the flexible sheet 157. Larger apertures, such as viewing ports 153, may also be formed in the flexible sheet 157. The viewing ports 153 may be covered with a transparent material to prevent the flow of air through the viewing ports 153.

The web shields 151 are specifically configured to facilitate a reduction in vortices emanating from the cargo door assembly 130 when opened and when the aircraft 100 is in flight. Additionally, the web shields 151 reduces the speed of air entering into the interior space 154 between the upper door 136 and the lower door 138 when the aircraft 100 is in flight. In other words, the web shields 151 acts like a curtain to help slow the rate of air entering the interior space 154 while the aircraft 100 is flying, which promotes stability of the crew and cargo within the interior space 154 during cargo offload operations.

In the illustrated embodiment, the upper door portion 132 further includes an aerodynamics control surface assembly 140. The aerodynamics control surface assembly 140 is fixed to a trailing end 133 of the upper door 136. Accordingly, the aerodynamics control surface assembly 140 is co-movable, or movable along, with the upper door 136 as the upper door 136 moves between the first open position and the first closed position, inclusive. However, the aerodynamics control surface assembly 140 includes a first aerodynamics control surface 142 (e.g., a first elevon or first flight control surface) that is selectively movable (e.g., pivotable) about a first aerodynamics control surface axis 196 relative to the upper door 136 (see, e.g., FIG. 7) to adjust a roll and/or a pitch of the aircraft 100. The first aerodynamics control surface axis 196 is non-movably fixed relative to the upper door 136. Therefore, while the first aerodynamics control surface 142 is movable relative to the upper door 136 (and movable independent of movement of the upper door 136), via the first aerodynamics control surface axis 196, the first aerodynamics control surface 142 also translationally moves along with the first aerodynamics control surface axis 196, via the fixed connection of the first aerodynamics control surface axis 196 to the upper door 136. Additionally, the first aerodynamics control surface axis 196 is parallel to the pitch axis 177 of the aircraft 100.

Figure 14:
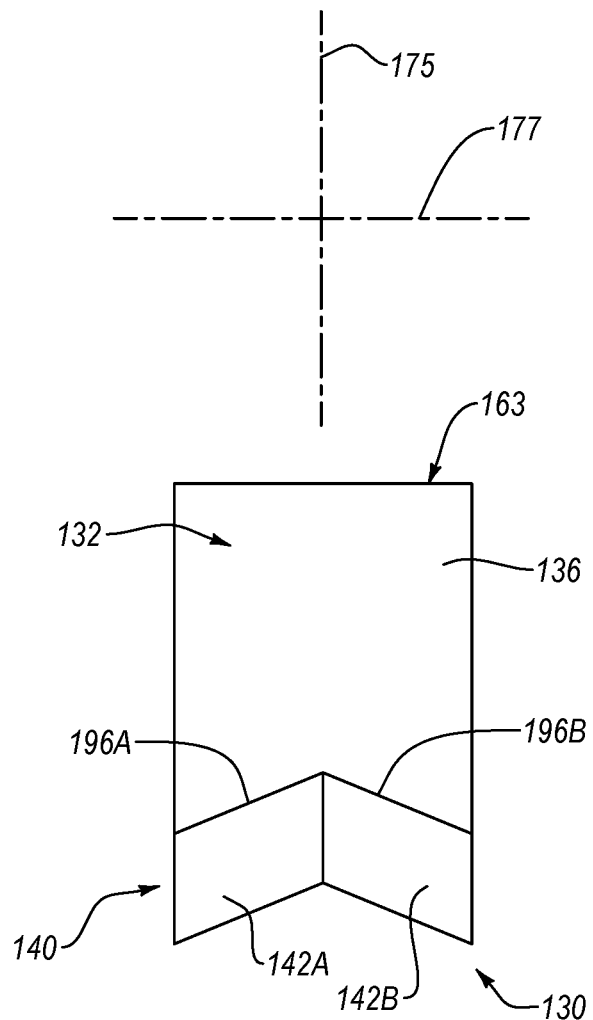
FIG. 14 is a top plan view of a cargo door assembly of an aircraft, according to one or more examples of the present disclosure.

However, in some embodiments, the first aerodynamics control surface axis is angled or non-parallel relative to the pitch axis 177 of the aircraft 100. For example, as shown in FIG. 14, a first aerodynamics control surface axis 196A about which a first aerodynamics control surface 142A pivots and a first aerodynamics control surface axis 196B about which a first aerodynamics control surface 142B pivots is angled relative to the pitch axis 177 and the roll axis 175. Notwithstanding the first aerodynamics control surface axis being angled or non-parallel relative to the pitch axis 177, in some implementations, the first aerodynamics control surface axis can be parallel to a plane perpendicular to the yaw axis 179 when the door to which the first aerodynamics control surface axis is coupled is in the closed position. In FIG. 14, the first aerodynamics control surface axis 196A and the first aerodynamics control surface axis 196B, as well as the trailing edges of the first aerodynamics control surface 142A and the first aerodynamics control surface axis 196B, are swept forward. But, in other embodiments, the first aerodynamics control surface axis 196A and the first aerodynamics control surface axis 196B, as well as the trailing edges of the first aerodynamics control surface 142A and the first aerodynamics control surface 142B can be swept rearward or in a direction opposite that shown in FIG. 14. In these later embodiments, the first aerodynamics control surface 142A and the first aerodynamics control surface 142B may be spaced apart and a fixed part of the upper door 136 may be positioned between to allow the first aerodynamics control surface 142A and the first aerodynamics control surface 142B to avoid contact with each other as they are actuated.

Although the aerodynamics control surface assembly 140 of the illustrated embodiment includes a single aerodynamics control surface or an aerodynamics control surface with a single flap, in other embodiments, the aerodynamics control surface assembly 140 can include any number of aerodynamics control surfaces or an aerodynamics control surface with any number of flaps. For example, referring to FIG. 14, the aerodynamics control surface assembly 140 of the cargo door assembly 130 includes two aerodynamics control surfaces, the first aerodynamics control surface 142A and the first aerodynamics control surface 142B, positioned relative to each other at the trailing end of the door 136 in a side-by-side manner. In some implementations, there is a gap or fixed portion of the upper door 136 between the first aerodynamics control surface 142A and the first aerodynamics control surface 142B.

Figure 7:
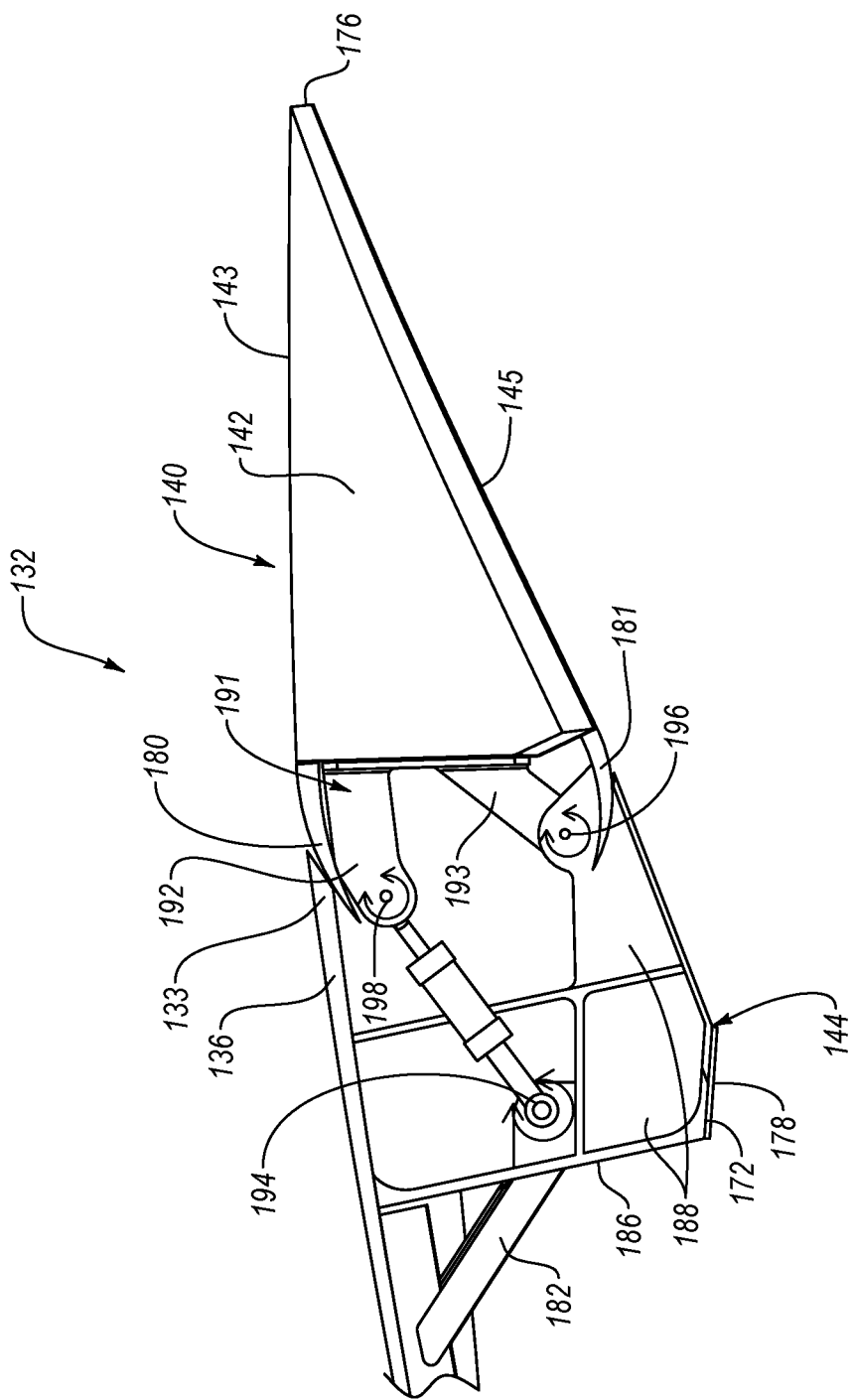
FIG. 7 is a cross-sectional side elevation view of an aerodynamics control surface assembly of the aircraft of FIG. 1, taken along the line 6-6 of FIG. 2, according to one or more examples of the present disclosure.
Figure 8:
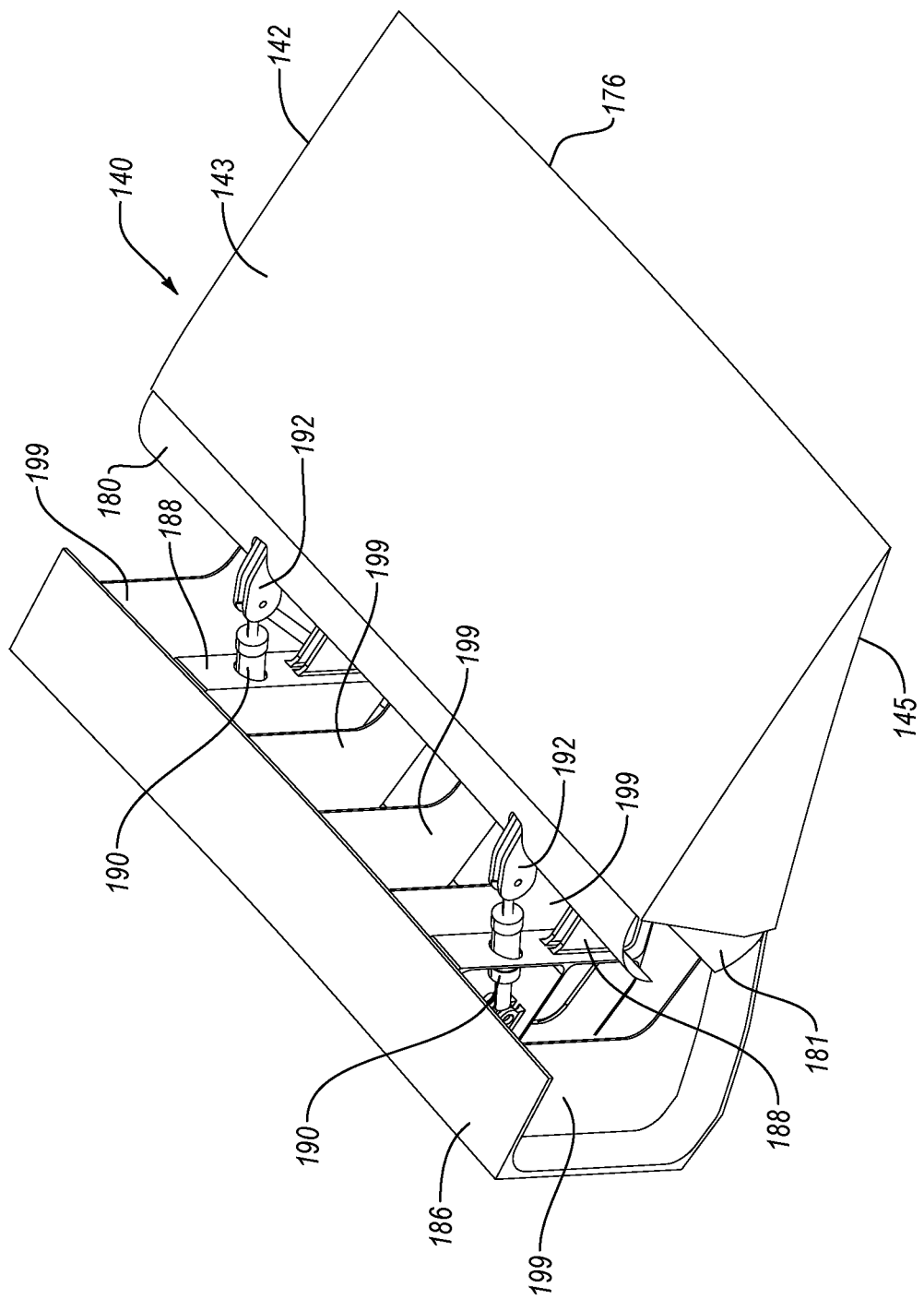
FIG. 8 is a perspective view of an aerodynamics control surface assembly of the aircraft of FIG. 1, according to one or more examples of the present disclosure.

Referring to FIG. 7, similar to conventional aerodynamics control surfaces, such as the third aerodynamics control surface 120 and the fourth aerodynamics control surface 121, the first aerodynamics control surface 142 includes a flap with a substantially wedge-shaped cross-section, along a plane parallel to both the roll axis 175 and the yaw axis 179. Moreover, the first aerodynamics control surface 142 has an upper surface 143 and a lower surface 145, opposite the upper surface 143. The upper surface 143 and the lower surface 145 of the first aerodynamics control surface 142 converge to a trailing edge 176 of the first aerodynamics control surface 142. The flap of the first aerodynamics control surface 142 is adjustable to adjust a roll and/or a pitch of the aircraft 100. In some implementations, as shown in FIGS. 2 and 11, when the upper door 136 is in the closed position, the trailing edge 176 of the first aerodynamics control surface 142 can be substantially co-linear with trailing edges 174 of the third aerodynamics control surface 120 and the fourth aerodynamics control surface 121. The first aerodynamics control surface 142 may include a plurality of internal beams or stringers encased by panels that define the upper surface 143 and the lower surface 145. The beams and panels can be made from any of various rigid materials, such as metals and fiber-reinforced polymers.

The first aerodynamics control surface 142 is coupled to the upper door 136 by a door interface 144. More specifically, the door interface 144 is directly coupled to the upper door 136 and the first aerodynamics control surface 142 is directly coupled to the door interface 144. Referring to FIGS. 7-10, the door interface 144 includes a housing 186 that is attached to an interior surface of the upper door 136. In some implementations, the housing 186 is attached to the interior surface of the upper door 136 using any of various attachment techniques, such as fastening, welding, bonding, and the like. The door interface 144 further includes spaced apart housing ribs 199 within and attached to the housing 186 using any of various attachment techniques, such as those presented above. In certain implementations, the housing ribs 199 are co-formed with the housing 186 to form a one-piece monolithic construction with the housing 186. The housing ribs 199 help strengthen and stiffen the housing 186.

The door interface 144 additionally includes actuator ribs 188 within and attached to the housing 186 using any of various attachment techniques, such as those presented above. Like the housing ribs 199, the actuator ribs 188 may help to strengthen and stiffen the housing 186. Additionally, each of the actuator ribs 188 supports a respective one of aerodynamics control surface actuators 190. In one implementation, each of the aerodynamics control surface actuators 190 is a linear actuator, such as a hydraulic-powered or pneumatic-powered piston cylinder. Each of the aerodynamics control surface actuators 190 is fixed to one of the actuator ribs 188 at a first end. The first end of the aerodynamics control surface actuators 190 are pivotable, relative to a corresponding actuator rib 188, about respective actuator axes 194 that are fixed to the corresponding actuator rib 188. The actuator axes 194 can be defined by a respective pin, shaft, or dowel secured to a corresponding actuator rib 188. In the illustrated embodiment, the aerodynamics control surface actuators 190 extend through an aperture formed in a corresponding actuator rib 188.

The door interface 144 also includes aerodynamics control surface brackets 191 attached to a leading surface of the first aerodynamics control surface 142 using any of various attachment techniques, such as those presented above. The aerodynamics control surface brackets 191 are non-movably fixed to the first aerodynamics control surface 142. Moreover, each of the aerodynamics control surface brackets 191 includes a first support arm 192 and a second support arm 193. The first support arm 192 is pivotally coupled with a second end of a respective one of the aerodynamics control surface actuators 190. More specifically, the second end of each of the aerodynamics control surface actuators 190 is pivotable about an actuator axis 198 fixed to the first support arm 192 of a respective one of the aerodynamics control surface brackets 191.

The actuator axes 198 can be defined by a respective pin, shaft, or dowel secured to the first support arm 192 of the corresponding aerodynamics control surface bracket 191. The second support arm 193 of each aerodynamics control surface bracket 191 is pivotally coupled with a respective one of the actuator ribs 188. More specifically, the second support arm 193 of each aerodynamics control surface bracket 191 is pivotable about the first aerodynamics control surface axis 196 fixed to second support arm 193 of a respective one of the aerodynamics control surface brackets 191. The first aerodynamics control surface axis 196 can be defined by a respective pin, shaft, or dowel secured to the second support arm 193 of the corresponding aerodynamics control surface bracket 191. The door interface 144 of the illustrated embodiment is just one example of any of various other door interfaces or couplings that could be used to pivotally couple the first aerodynamics control surface 142 to the upper door 136.

Each of the aerodynamics control surface actuators 190 is configured to move the opposite first and second ends relative to each other when actuated. Generally, the aerodynamics control surface actuators 190 are actuatable to move the opposite first and second ends of the aerodynamics control surface actuators 190 away from each other, to cause the first aerodynamics control surface 142 to pivot in a first downward rotational direction (see, e.g., FIG. 9), and actuatable to move the opposite first and second ends of the aerodynamics control surface actuator 190 toward each other, to cause the first aerodynamics control surface 142 to pivot in an upward rotational direction (see, e.g., FIG. 10). Accordingly, as the aerodynamics control surface actuators 190 extend, the first aerodynamics control surface 142 is adjusted downwardly, and as the aerodynamics control surface actuators 190 retract, the first aerodynamics control surface 142 is adjusted upwardly. As show in FIG. 7, when the first aerodynamics control surface 142 is in a neutral position, the upper surface 143 of the first aerodynamics control surface 142 is substantially flush or co-planar with any exterior surface of the upper door 136. However, as the first aerodynamics control surface 142 is adjusted upwardly or downwardly, the upper surface 143 of the first aerodynamics control surface 142 is angled with respect to the exterior surface of the upper door 136.

Figure 9:
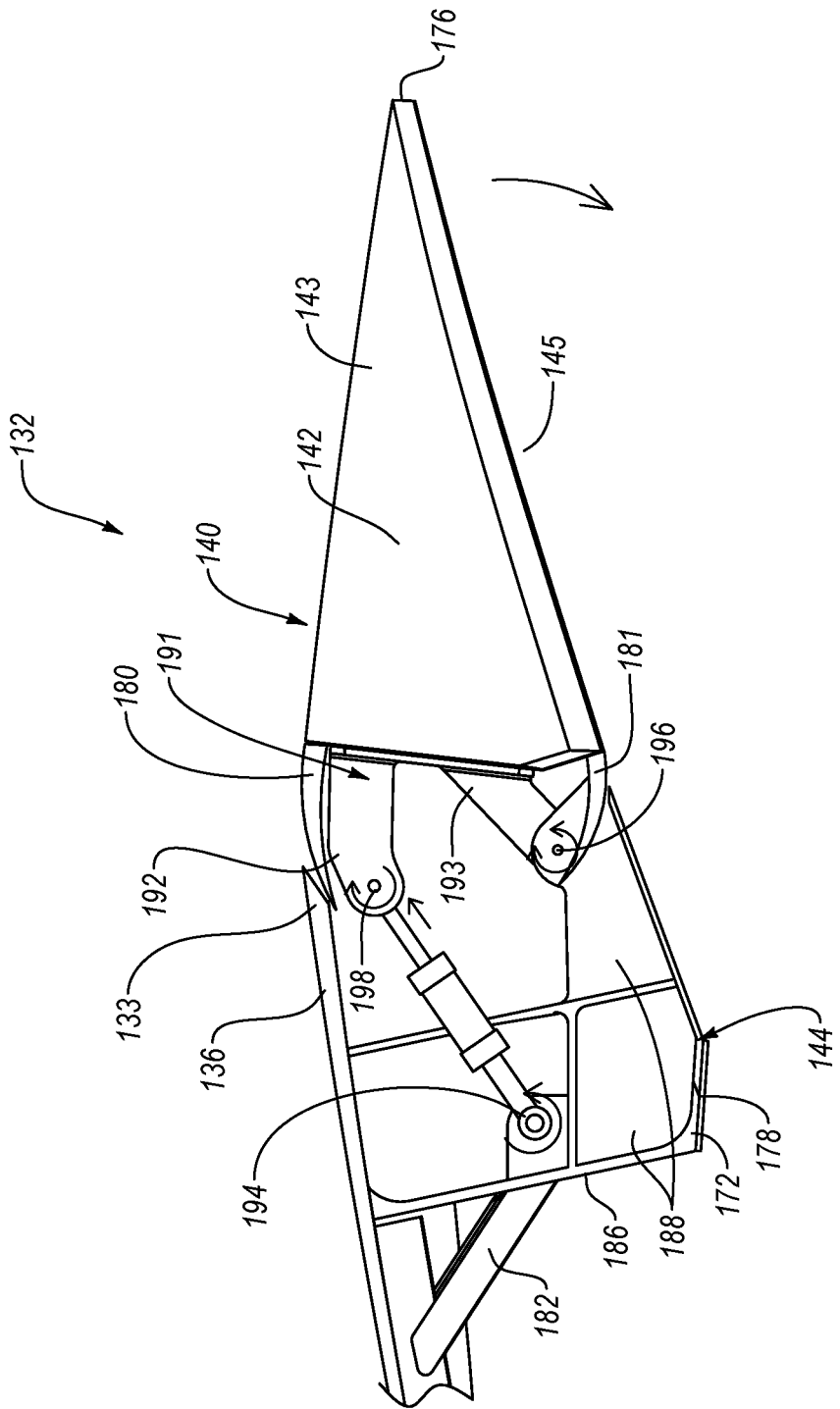
FIG. 9 is a cross-sectional side elevation view of an aerodynamics control surface assembly of the aircraft of FIG. 1, taken along the line 6-6 of FIG. 2 and shown with an aerodynamics control surface in a downward position, according to one or more examples of the present disclosure.
Figure 10:
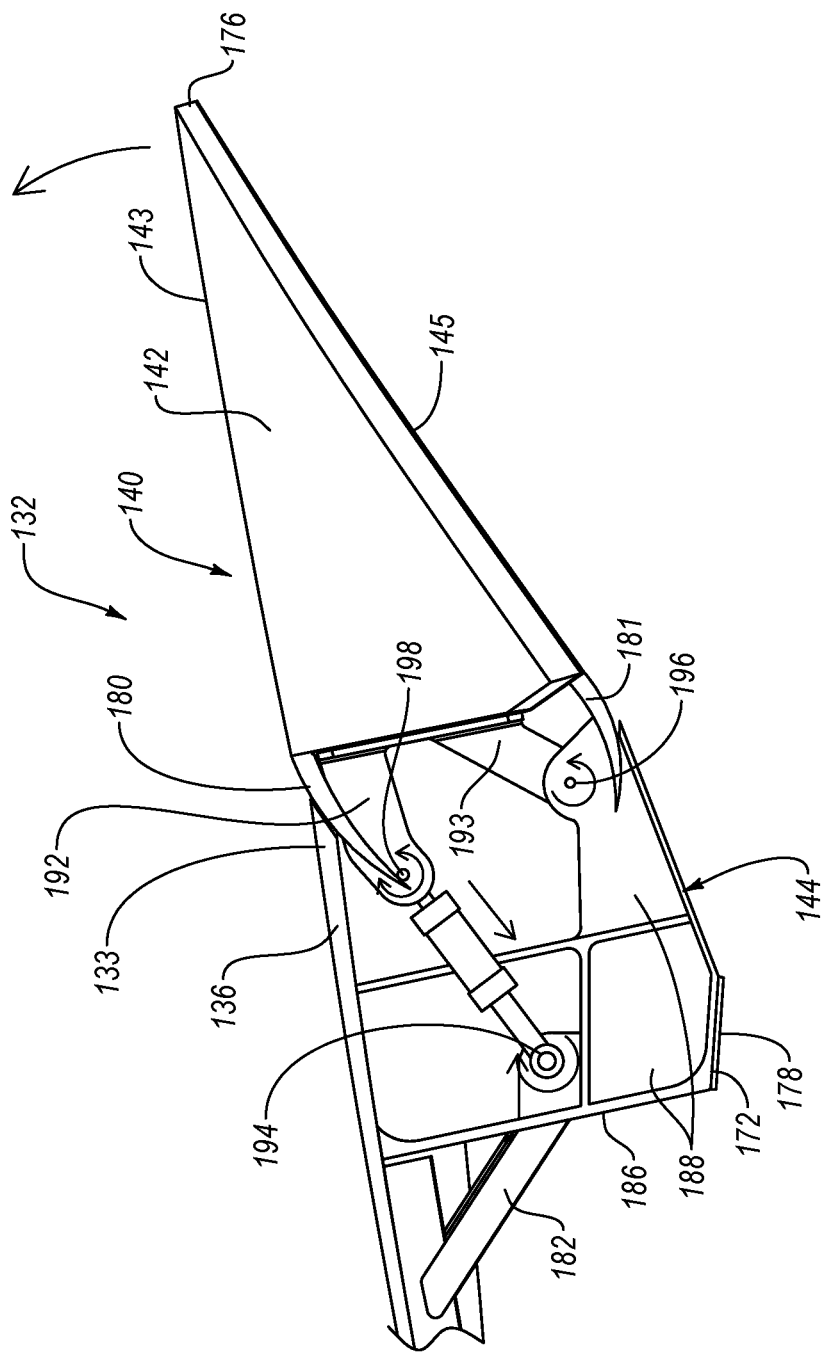
FIG. 10 is a cross-sectional side elevation view of an aerodynamics control surface assembly of the aircraft of FIG. 1, taken along the line 6-6 of FIG. 2 and shown with an aerodynamics control surface in an upward position, according to one or more examples of the present disclosure.

As the first aerodynamics control surface 142 is adjusted downwardly, an upper gap between the upper surface 143 of the first aerodynamics control surface 142 and the trailing end 133 of the upper door 136 increases. Similarly, as the first aerodynamics control surface 142 is adjusted upwardly, a lower gap between the lower surface 145 of the first aerodynamics control surface 142 and the housing 186 of the door interface 144 increases. Referring to FIGS. 9 and 10, to effectively cover the upper and lower gaps as the size of the gaps adjusts in response to adjustment of the first aerodynamics control surface 142, the aerodynamics control surface assembly 140 further includes an upper shield 180 (e.g., upper radius nose) and a lower shield 181 (e.g., lower radius nose). The upper shield 180 is co-movably fixed to the first aerodynamics control surface 142 at an intersection between the trailing edge and the upper surface 143 of the first aerodynamics control surface 142 to cover the upper gap between the between the upper surface 143 of the first aerodynamics control surface 142 and the trailing end 133 of the upper door 136. The outer surface of the upper door 136 can be tangential to the upper shield 180. As the first aerodynamics control surface 142 pivots, the upper shield 180 moves with the first aerodynamics control surface 142 to maintain coverage of the upper gap. In contrast, the lower shield 181 is co-movably fixed to the first aerodynamics control surface 142 at an intersection between the trailing edge and the lower surface 145 of the first aerodynamics control surface 142 to cover the gap between the lower surface 145 of the first aerodynamics control surface 142 and the housing 186 of the door interface 144. The inner surface of the housing 186 can be tangential to the lower shield 181. As the first aerodynamics control surface 142 pivots, the lower shield 181 moves with the first aerodynamics control surface 142 to maintain coverage of the lower gap.

Referring to FIG. 11, the housing 186 of the door interface 144 of the aerodynamics control surface assembly 140 includes a door engagement surface 172. Referring to FIG. 11, the door engagement surface 172 is configured to engage a trailing edge surface 170 of the lower door 138 when the cargo door assembly 130 is closed (e.g., the upper door 136 is in the closed position and the lower door 138 is in the closed position). Engagement between the door engagement surface 172 and the trailing edge surface 170 provides a seal between the door engagement surface 172 and the trailing edge surface 170. Such a seal prevents loss of pressure within the aircraft 100, such as when the aircraft 100 is pressurized during flight. In some implementations, the door engagement surface 172 is tapered relative to the upper door 136 and the trailing edge surface 170 is correspondingly tapered relative to the lower door 138 to effectively match the taper of, and be parallel with (e.g., sit flush against), the door engagement surface 172 when the cargo door assembly 130 is closed.

To promote the seal between the door engagement surface 172 and the trailing edge surface 170, the cargo door assembly 130 includes a sealing member 178 that is sandwiched between the door engagement surface 172 and the trailing edge surface 170 when the cargo door assembly 130 is closed. In one implementation, the sealing member 178 is co-movably fixed to the door engagement surface 172 of the door interface 144 (see, e.g., FIG. 7) via any of various fixation techniques, such as adhesion, bonding, fastening, and the like. However, in other implementations, the sealing member 178 is co-movably fixed to the trailing edge surface 170 of the lower door 138. Alternatively, in certain implementations, the sealing member 178 includes one portion co-movably fixed to the door engagement surface 172 and another corresponding portion co-movably fixed to the trailing edge surface 170. In one implementation, the sealing member 178 is resiliently deformable and made from an elastomeric material, such as plastic or rubber. According to certain implementations, the sealing member 178 can be any of various seals, sealants, gaskets, and the like.

Figure 12:
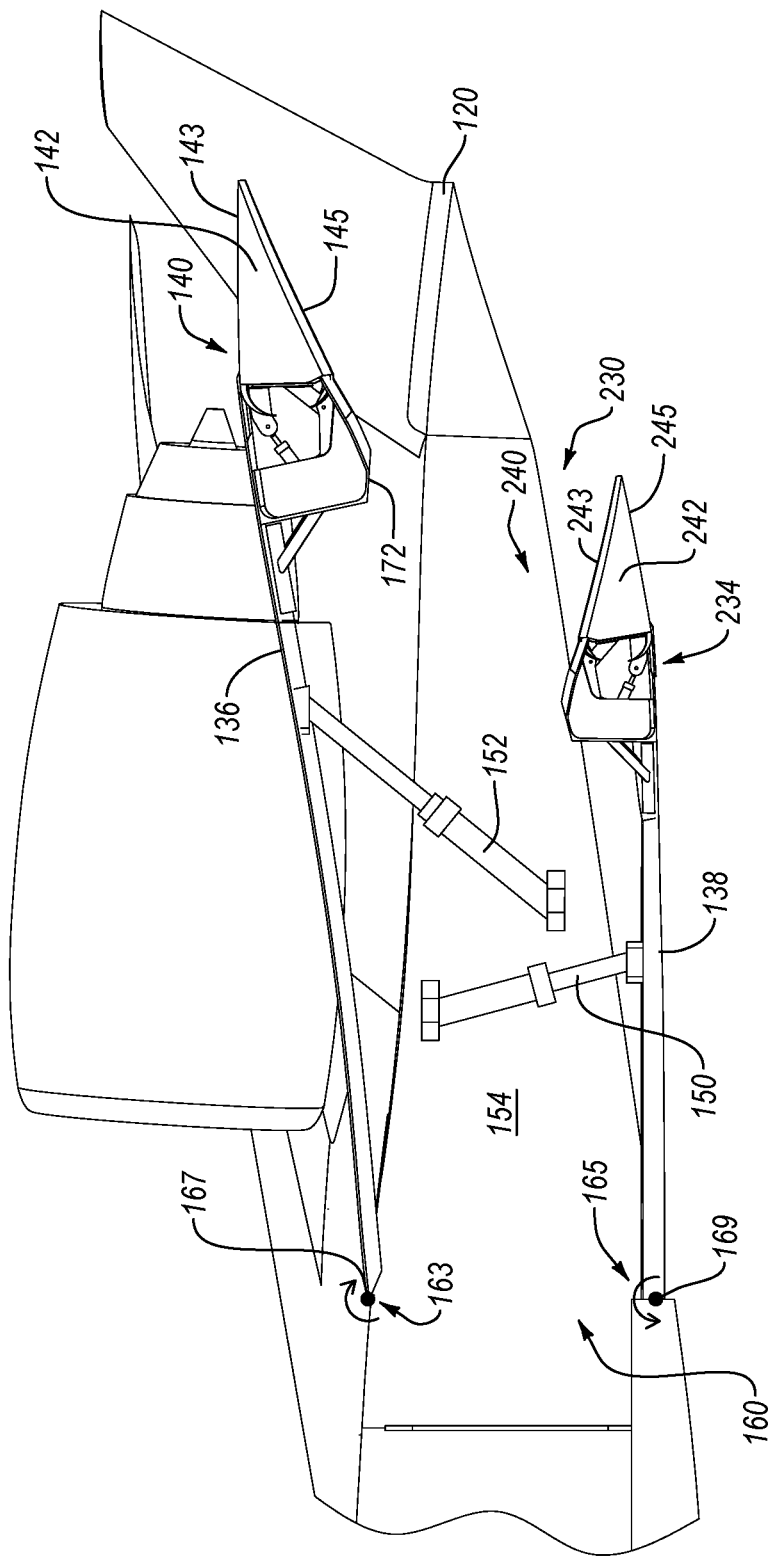
FIG. 12 is a cross-sectional side elevation view of a cargo door assembly of an aircraft, taken along a line similar to line 6-6 of FIG. 2, according to one or more examples of the present disclosure.

As shown in FIGS. 1-11, according to one embodiment, the cargo door assembly 130 of the aircraft 100 includes an aerodynamics control surface assembly 140 attached only to the upper door 136 of the cargo door assembly 130. However, in another embodiment, as shown in FIG. 12, the aircraft 100 includes, in addition to the aerodynamics control surface assembly 140 attached to the upper door 136, another aerodynamics control surface assembly 240 attached to the lower door 138. Accordingly, the aircraft 100 can include an aerodynamics control surface assembly attached to each of the upper door 136 and the lower door 138 of a cargo door assembly 230. The aerodynamics control surface assembly 240 attached to the lower door 138 includes features analogous to the features of the aerodynamics control surface assembly 140, with like numbers referring to like features. For example, the aerodynamics control surface assembly 240 includes a second aerodynamics control surface 242 (e.g., a second elevon or second flight control surface) that is selectively movable relative to the lower door 138 to adjust at least one of a pitch or a roll of the aircraft 100 when in flight.

When the cargo door assembly 230 is open, the second aerodynamics control surface 242 (e.g., lower aerodynamics control surface), of the aerodynamics control surface assembly 240, can be moved relative to the lower door 138 independently of movement of the first aerodynamics control surface 142 (e.g., upper aerodynamics control surface), of the aerodynamics control surface assembly 140, relative to the upper door 136. Moreover, when the cargo door assembly 230 is closed, the first aerodynamics control surface 142 and the second aerodynamics control surface 242 can be co-movable with each other relative to the upper door 136 and the lower door 138. In the illustrated example, when the cargo door assembly 230 is closed, the lower surface 145 may engage the door engagement surface 172 to form a seal. However, in other examples, when the cargo door assembly 230 is closed, an upper surface 243 of the second aerodynamics control surface 242 may contact and sit flush against the lower surface 145 of the first aerodynamics control surface 142 to allow the first aerodynamics control surface 142 and the second aerodynamics control surface 242 to cooperatively function as a single aerodynamics control surface. However, when the cargo door assembly 230 is closed, the first aerodynamics control surface 142 and the second aerodynamics control surface 242 can be independently movable relative to each other and the upper door 136 and the lower door 138, respectively.

Figure 13:
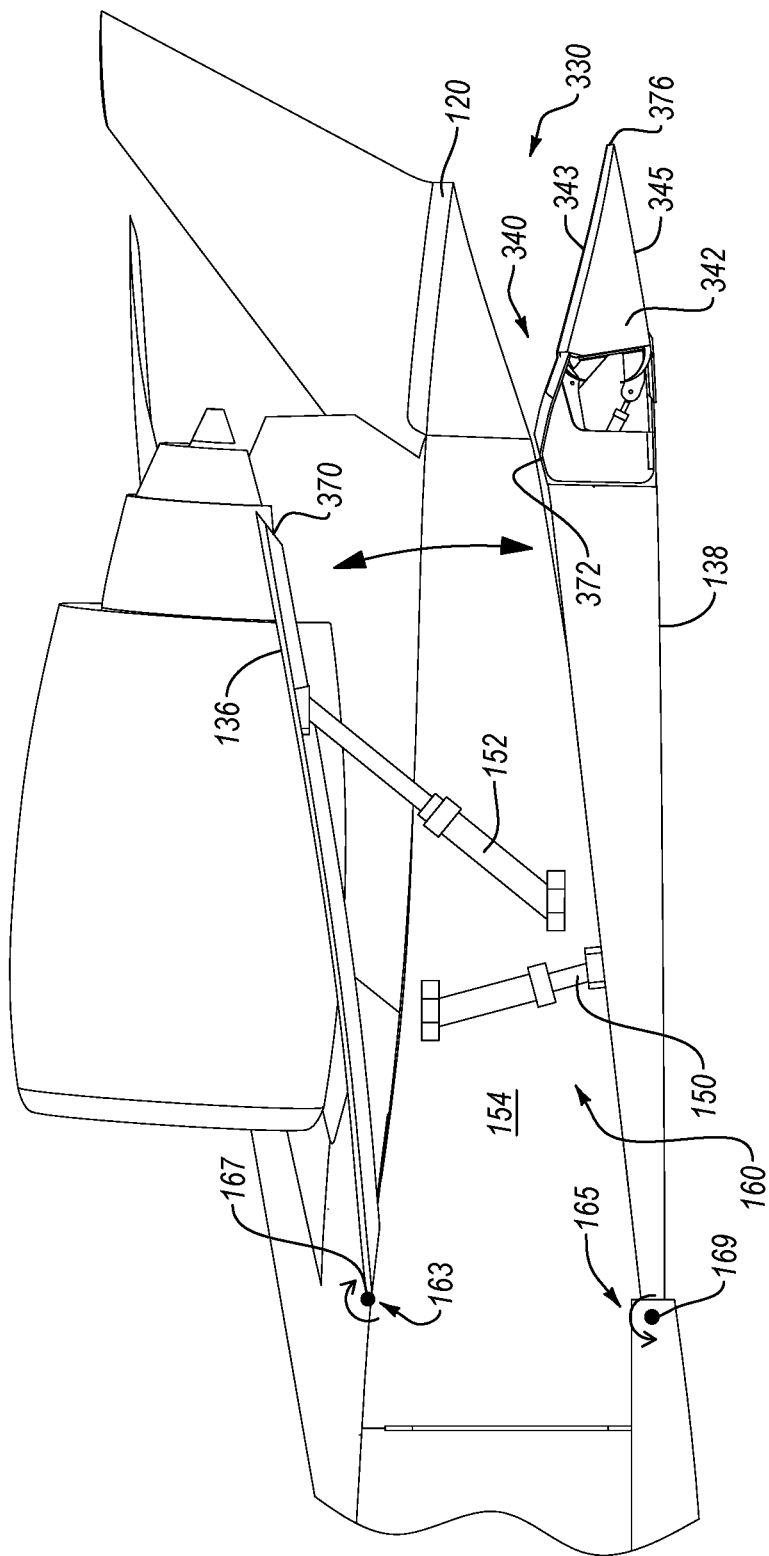
FIG. 13 is a cross-sectional side elevation view of a cargo door assembly of an aircraft, taken along a line similar to line 6-6 of FIG. 2, according to one or more examples of the present disclosure.

According to yet another embodiment, as shown in FIG. 13, a cargo door assembly 330 of the aircraft 100 includes an aerodynamics control surface assembly 340 attached only to the lower door 138 of the cargo door assembly 330. Accordingly, the upper door 136 does not have an aerodynamics control surface assembly attached to it. The upper door 136 includes a trailing edge surface 370 that engages the door engagement surface 372 of the aerodynamics control surface assembly 340 when the cargo door assembly 330 is closed to form a seal against the aerodynamics control surface assembly 340. The aerodynamics control surface assembly 340 attached to the lower door 138 includes features analogous to the features of the aerodynamics control surface assembly 140, with like numbers referring to like features. The aerodynamics control surface assembly 340 may include a protective layer or coating applied onto the upper surface 343 of the aerodynamics control surface 342 to protect the aerodynamics control surface 342 from damage as cargo and/or personnel traverse the aerodynamics control surface assembly 340 to enter or exit the interior space 154 of the aircraft 100. Furthermore, an interior surface of the lower door 138 may be substantially slush with the door engagement surface 372 to provide a relatively smooth transition between the upper surface 343 of the aerodynamics control surface 342 and the interior surface of the lower door 138.

Although the aircraft 100 depicted in the figures is a blended wing body aircraft, the features of the cargo door assembly described herein are applicable to other types of aircraft, such as commercial passenger aircraft with a distinct division between body and wings, a flying wing aircraft, spacecraft, or other vehicles, such as watercraft (e.g., submersibles), hovercraft, automobiles, and the like.

Figure 15:
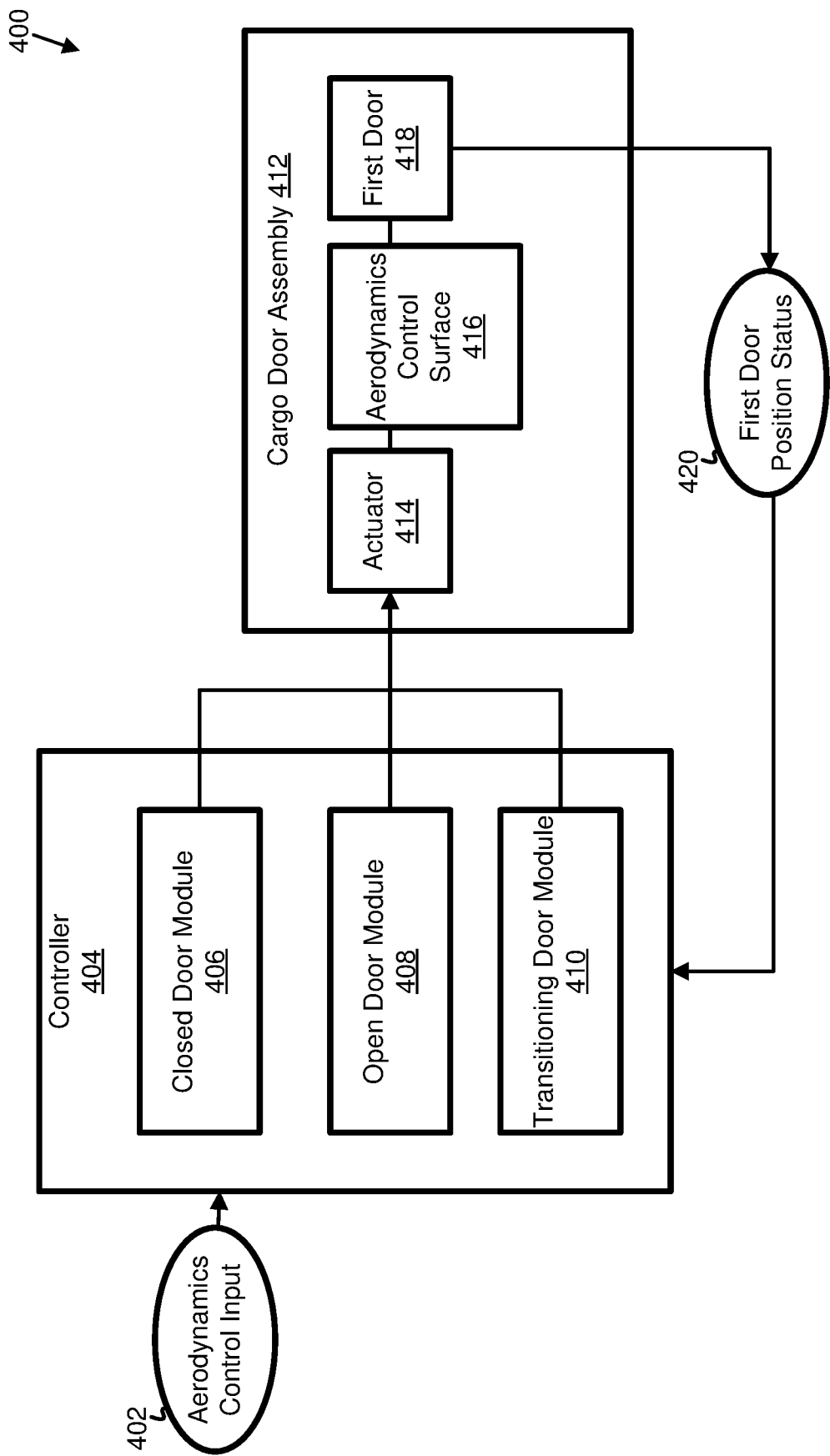
FIG. 15 is a schematic block diagram of a system of an aircraft, according to one or more examples of the present disclosure.

Referring to FIG. 15, one embodiment of a system 400 for a vehicle, such as the aircraft 100, is shown. The system 400 includes a cargo door assembly 412, which can be the same as or similar to any one of the cargo door assemblies 130, 230, 330 described herein. The cargo door assembly 412 includes at least an aerodynamics control surface 416 movably coupled to a first door 418 of the cargo door assembly 412. The cargo door assembly 412 additionally includes an actuator 414 that is coupled to the aerodynamics control surface 416 and actuatable to move (e.g., pivot) the aerodynamics control surface 416 relative to the first door 418. Although not shown, the cargo door assembly 412 includes one or more other actuators that are actuatable to move (e.g., pivot) the first door 418 between a closed position and an open position relative to a body of the aircraft. Generally, the first door 418 can be opened during flight or motion to allow cargo or personnel within the aircraft to exit the aircraft through an exit created by the opened first door 418. Due to the clam-shell configuration of the cargo door assembly 412, when the first door 418 is opened during flight, the first door 418 causes a change in the overall aerodynamics of the aircraft. Accordingly, the flight characteristics of the aircraft 100 when the cargo door assembly 412 is closed are different than when the cargo door assembly 412 is open or opening.

The system 400 further includes a controller 404 configured to control aerodynamics surfaces of the aircraft, according to aerodynamics control input 402, to achieve desired aerodynamics characteristics corresponding with the aerodynamics control input 402. The aerodynamics control input 402 can be generated by any of various sources. For example, in one implementation, the aerodynamics control input 402 includes manual input from a pilot or pilots of the aircraft of driver or drivers of a vehicle. Additionally, or alternatively, the aerodynamics control input 402 is generated by an auto-pilot system on board or remote from the aircraft or an auto-driver system on board or remote from the vehicle. Depending on the desired aerodynamics characteristics, the aerodynamics control surface controlled by the controller 404 is the aerodynamics control surface 416. More specifically, in response to the aerodynamics control input 402, the controller 404 is configured to transmit control signals to the actuator 414, which actuates to cause the aerodynamics control surface 416 to move relative to the first door 418.

Due to the effect of the first door 418 on the aerodynamics characteristics of the aircraft, the movement of the aerodynamics control surface 416 may need to be different for a given aerodynamics control input 402 depending on the state of the first door 418. For example, a aerodynamics control input 402 to adjust a pitch of the aircraft by a certain degree may be achieved by adjusting the aerodynamics control surface 416 a first amount, when the first door 418 is in a closed position, and a second amount, different than the first amount, when the first door 418 is in an open position due to the effect the first door 418 has on pitch control when open. Further, because the first door 418 affects the aerodynamics characteristics of the aircraft differently when the first door 418 is moving between the open and closed position, as opposed to when the first door 418 is statically held in one of the open position or the closed position, the movement of the aerodynamics control surface 416 may need to be different for a given aerodynamics control input 402 based on whether the first door 418 is moving or not.

The controller 404 is configured to receive the aerodynamics control input 402 and control movement of the aerodynamics control surface 416 differently in response to the first door 418 being in a closed position, an open position, or transitioning between the closed position and the open position. For this purpose, the controller 404 includes a closed door module 406, an open door module 408, and a transitioning door module 410. The controller 404 also receives a first door position status 420 identifying the position status of the first door 418 as one of closed, open, or transitioning. The first door position status 420 may be generated by sensed data received from a virtual sensor or a physical sensor in sensing engagement with the first door 418.

When the first door position status 420 indicates the first door 418 is closed, the controller 404 utilizes the closed door module 406 to generate control signals for the actuator 414 according to a first mode of operation of the aerodynamics control surface 416. When the first door position status 420 indicates the first door 418 is open, the controller 404 utilizes the open door module 408 to generate control signals for the actuator 414 according to a second mode of operation of the aerodynamics control surface 416. When the first door position status 420 indicates the first door 418 is transitioning between being open and closed, the controller 404 utilizes the transitioning door module 410 to generate control signals for the actuator 414 according to a third mode of operation of the aerodynamics control surface 416. The first mode of operation, the second mode of operation, and the third mode of operation are different in some implementations. Accordingly, in such implementations, for the same aerodynamics control input 402, the control signal generated by the controller 404 to control actuation of the actuator 414, and thus the movement of the aerodynamics control surface 416, is different depending on which of the first, second, and third modes of operation is implemented. However, in other implementations, one or more (e.g., all three) of the first mode of operation, the second mode of operation, and the third mode of operation are the same.

Although the system 400 has been described with reference to one cargo door with one aerodynamics control surface movably coupled to the cargo door, the system 400 can be further configured to control two or more cargo doors (e.g., a second cargo door) and/or two or more aerodynamics control surfaces, all movably coupled to one cargo door or one or more movably coupled to one cargo door and one or more movably coupled to another cargo door.

Figure 16:
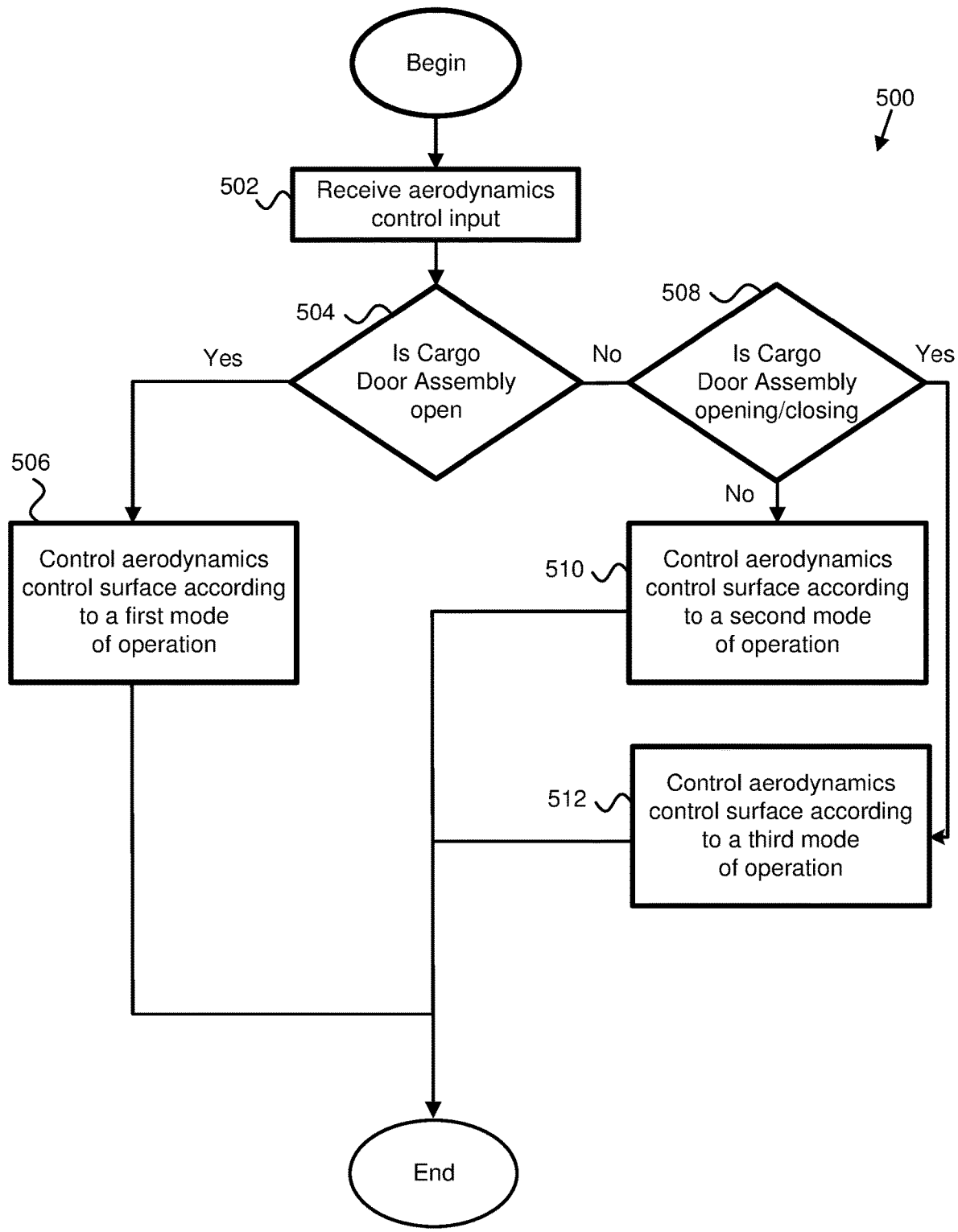
FIG. 16 is a schematic flow diagram of a method of controlling movement of a vehicle, according to one or more examples of the present disclosure.

Referring to FIG. 16, according to one embodiment, a method 500 of controlling movement of a vehicle, such as the aircraft 100, is shown. The vehicle or aircraft includes a cargo door assembly. In one implementation, the method 500 is executable by the system 400. The method 500 includes receiving aerodynamics control input at 502. The method 500 additionally includes determining whether the cargo door assembly, with a first aerodynamics control surface movably coupled to a first door of the cargo door assembly, is open at 504. In other words, the method 500 determines whether the first door of the cargo door assembly is in an open position. If the cargo door assembly is open, then the method 500 proceeds to control (e.g., moves) the aerodynamics control surface, attached to the first door of the cargo door assembly, according to a first mode of operation at 506. If the cargo door assembly is not open, then the method 500 determines whether the cargo door assembly is opening or closing at 508. If the cargo door assembly is not opening or closing at 508, then the cargo door assembly is closed, or the first door of the cargo door assembly is in a closed position, and the method 500 proceeds to control the aerodynamics control surface, attached to the first door of the cargo door assembly, according to a second mode of operation at 510. However, if the cargo door assembly is opening or closing at 508 (e.g., the first door of the cargo door assembly is actively transitioning between an open position and a closed position), then the method 500 proceeds to control the aerodynamics control surface, attached to the first door of the cargo door assembly, according to a third mode of operation at 512. According to the method 500, the first mode of operation, the second mode of operation, and the third mode of operation are different from each other.

Although the method 500 has been described with reference to one cargo door with one aerodynamics control surface movably coupled to the cargo door, the method 500 can be followed to control two or more cargo doors (e.g., a second cargo door) and/or two or more aerodynamics control surfaces, all movably coupled to one cargo door or one or more movably coupled to one cargo door and one or more movably coupled to another cargo door.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the controller 404 and any of the various modules of the controller 404 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The controller 404 and associated modules may be implemented as a hardware circuit comprising custom very-large-scale integration (VLSI) circuits or gate arrays, off-the-shelf semiconductors such as logic chips, transistors, or other discrete components. The controller 404 and associated modules may also be implemented in programmable hardware devices such as field programmable gate arrays, programmable array logic, programmable logic devices or the like.

The controller 404 and associated modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the controller 404 and associated modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A vehicle, comprising:
   a body; and
   a cargo door assembly, coupled to the body and comprising:
     a first door, configured to move relative to the body between a first closed position and a first open position; and
     a first aerodynamics control surface, coupled to the first door and selectively movable relative to the first door.

2. The vehicle according to claim 1, wherein:
   the body defines an interior space of the vehicle;
   the body comprises a body leading end and a body trailing end;
   the body trailing end is opposite the body leading end;
   the cargo door assembly is coupled to the body trailing end;
   the first door is configured to restrict access to the interior space of the vehicle in the first closed position;
   the first door configured to allow access to the interior space of the vehicle in the first open position; and
   movement of the first aerodynamics control surface relative to the first door adjusts at least one of a pitch or a roll of the vehicle when in motion.

3. The vehicle according to claim 1, wherein the vehicle is a blended wing body aircraft.

4. The vehicle according to claim 1, wherein:
   the first door comprises a door trailing end; and
   the first aerodynamics control surface is coupled to the door trailing end.

5. The vehicle according to claim 1, wherein the first aerodynamics control surface is configured to selectively move relative to the first door when the first door is in the first closed position, the first open position, and while the first door moves between the first closed position and the first open position.

6. The vehicle according to claim 1, wherein:
   the cargo door assembly further comprises an aerodynamics control surface assembly comprising the first aerodynamics control surface and a door interface;
   the door interface couples the first aerodynamics control surface to the first door; and
   the door interface comprises at least one aerodynamics control surface actuator that is configured to be selectively actuate to move the first aerodynamics control surface relative to the first door.

7. The vehicle according to claim 6, wherein:
   the first door comprises a interior surface and an exterior surface, opposite the interior surface; and
   the door interface is coupled directly to the interior surface of the first door.

8. The vehicle according to claim 1, wherein the first door is configured to pivot about a first door axis that is parallel to a pitch axis of the vehicle.

9. The vehicle according to claim 8, wherein the first aerodynamics control surface is configured to pivot about a first aerodynamics control surface axis that is parallel to the pitch axis of the vehicle.

10. The vehicle according to claim 1, wherein:
    the cargo door assembly further comprises a second door configured to move relative to the body and the first door between a second closed position and a second open position;
    the first door is configured to pivot about a first door axis that is parallel to a pitch axis of the vehicle; and
    the second door is configured to pivot about a second door axis that is parallel to the pitch axis of the vehicle and offset from the first door axis.

11. The vehicle according to claim 10, wherein:
    the cargo door assembly further comprises an aerodynamics control surface assembly comprising the first aerodynamics control surface and a door interface, coupling the first aerodynamics control surface to the first door; and
    the second door is sealed to the door interface when the first door is in the first closed position and the second door is in the second closed position.

12. The vehicle according to claim 10, wherein:
    the first door is an upper door; and
    the second door is a lower door.

13. The vehicle according to claim 12, wherein:
    the vehicle is an aircraft; and
    the cargo door assembly further comprises a second aerodynamics control surface, coupled to the second door and configured to selectively move relative to the second door to adjust at least one of a pitch or a roll of the aircraft when in flight.

14. The vehicle according to claim 13, wherein the first aerodynamics control surface and the second aerodynamics control surface are co-movably engaged when the first door is in the first closed position and the second door is in the second closed position.

15. The vehicle according to claim 10, wherein:
the first door is a lower door; and
the second door is an upper door.

16. The vehicle according to claim 10, wherein:
the cargo door assembly further comprises web shields each secured to and extending between the first door and the second door;
the web shields are spaced apart from each other across a width of the first door and the second door; and
the web shields each comprises a flexible sheet and a plurality of perforations formed in the flexible sheet.

17. A system of a vehicle, the system comprising:
a cargo door assembly, comprising:
a first door, configured to move between a first closed position and a first open position;
a first aerodynamics control surface, movably coupled to the first door; and
an actuator, coupled to the first aerodynamics control surface; and
a controller, operatively coupled with the actuator and configured to cause the actuator to move the first aerodynamics control surface relative to the first door in response to aerodynamics control input.

18. The system according to claim 17, wherein the controller is further configured to cause the actuator to move the first aerodynamics control surface relative to the first door in further response to a position status of the first door, the controller comprising:
a closed door module, configured to cause the actuator to move the first aerodynamics control surface relative to the first door according to a first mode of operation when the position status of the first door is closed;
an open door module, configured to cause the actuator to move the first aerodynamics control surface relative to the first door according to a second mode of operation when the position status of the first door is open; and
a transitioning door module, configured to cause the actuator to move the first aerodynamics control surface relative to the first door according to a third mode of operation when the position status of the first door is transitioning between the first closed position and the first open position;
wherein the first mode of operation, the second mode of operation, and the third mode of operation are different from each other.

19. A method of controlling movement of a vehicle, comprising:
receiving aerodynamics control input; and
moving a first aerodynamics control surface in response to the aerodynamics control input;
wherein the first aerodynamics control surface is movably coupled to a first door of a cargo door assembly of the vehicle.

20. The method according to claim 19, wherein:
moving the first aerodynamics control surface further comprises:
moving the first aerodynamics control surface according to a first mode of operation when the first door is in a first closed position;
moving the first aerodynamics control surface according to a second mode of operation when the first door is in a first open position; and
moving the first aerodynamics control surface according to a third mode of operation when the first door is moving between the first open position and the first closed position; and
the first mode of operation, the second mode of operation, and the third mode of operation are different from each other.

* * * * *